US 11,228,890 B2

(12) United States Patent
Choi et al.

(10) Patent No.: US 11,228,890 B2
(45) Date of Patent: Jan. 18, 2022

(54) ELECTRONIC DEVICE SUPPORTING PROXIMITY COMMUNICATION SERVICE AND METHOD FOR OBTAINING INFORMATION OF SHORT-RANGE COMMUNICATION DEVICE USING THE SAME

(71) Applicant: Samsung Electronics Co., Ltd., Gyeonggi-do (KR)

(72) Inventors: Jongmu Choi, Gyeonggi-do (KR); Doosuk Kang, Gyeonggi-do (KR); Inshik Shin, Gyeonggi-do (KR); Buseop Jung, Gyeonggi-do (KR); Bokun Choi, Gyeonggi-do (KR); Sungjun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/077,096

(22) Filed: Oct. 22, 2020

(65) Prior Publication Data
US 2021/0127244 A1    Apr. 29, 2021

(30) Foreign Application Priority Data
Oct. 28, 2019   (KR) .......................... 10-2019-0134850

(51) Int. Cl.
*H04W 8/00*   (2009.01)
*H04W 4/80*   (2018.01)
(Continued)

(52) U.S. Cl.
CPC ............. *H04W 4/80* (2018.02); *H04W 8/005* (2013.01); *H04W 40/246* (2013.01); *H04W 84/18* (2013.01); *H04W 88/06* (2013.01)

(58) Field of Classification Search
CPC .............................. H04W 4/80; H04W 8/005
See application file for complete search history.

(56) References Cited

U.S. PATENT DOCUMENTS 9,351,102 B2   5/2016   Tucker et al.
9,479,907 B2   10/2016  Nespolo
(Continued)

FOREIGN PATENT DOCUMENTS

KR   10-2016-0063110 A   6/2016
KR   10-2017-0036619 A   4/2017
(Continued)

OTHER PUBLICATIONS

International Search Report dated Jan. 17, 2021.

*Primary Examiner* — Tuan H Nguyen
(74) *Attorney, Agent, or Firm* — Cha & Reiter, LLC

(57) ABSTRACT

According to certain embodiments, an electronic device comprises a first communication circuit configured to support a first communication protocol; a display; and at least one processor operatively connected to the first communication circuit and the display, wherein the at least one processor is configured to: configure a cluster with at least one external electronic device based on the first communication protocol device through the first communication circuit, receive through the first communication circuit, from the at least one external electronic device, information identifying at least one short-range communication device connected to the at least one external electronic device via a second communication protocol, and control the display to display at least one indicator of the at least one short-range communication device based on the information received from the at least one external electronic device.

16 Claims, 15 Drawing Sheets

(51) Int. Cl.
*H04W 40/24* (2009.01)
*H04W 88/06* (2009.01)
*H04W 84/18* (2009.01)

(56) References Cited

U.S. PATENT DOCUMENTS

| | | |
|---|---|---|
| 9,913,079 B2 | 3/2018 | Srivatsa et al. |
| 2016/0150357 A1* | 5/2016 | Jung ........................ H04W 4/80 |
| | | 455/41.1 |
| 2017/0055305 A1* | 2/2017 | Kurian .................. H04W 8/005 |
| 2017/0094496 A1 | 3/2017 | Aoki |
| 2017/0155720 A1 | 6/2017 | Song et al. |
| 2017/0280377 A1 | 9/2017 | Patil et al. |
| 2018/0332459 A1 | 11/2018 | Aoki et al. |

FOREIGN PATENT DOCUMENTS

| | | |
|---|---|---|
| KR | 10-2017-0061489 A | 6/2017 |
| WO | 2019/055098 A1 | 3/2019 |

\* cited by examiner

ELECTRONIC DEVICE SUPPORTING PROXIMITY COMMUNICATION SERVICE AND METHOD FOR OBTAINING INFORMATION OF SHORT-RANGE COMMUNICATION DEVICE USING THE SAME

CROSS-REFERENCE TO RELATED APPLICATION

This application is based on and claims priority under 35 U.S.C. § 119 to Korean Patent Application No. 10-2019-0134850 filed on Oct. 28, 2019, in the Korean Intellectual Property Office, the disclosure of which is herein incorporated by reference in its entirety.

BACKGROUND

Field

Certain embodiments of the disclosure relate to an electronic device supporting a proximity communication service and a method for obtaining information of a short-range communication device using the same.

Description of Related Art

A proximity service can utilize a low-power short-range communication. For example, a proximity services can exchange data through a proximity network. The proximity service may include a low-power proximity service using a Bluetooth low-energy (BLE) beacon or a neighbor awareness networking (NAN) (or Wi-Fi aware) based low-power proximity service based on a wireless local area network (WLAN).

SUMMARY

According to certain embodiments, an electronic device comprises a first communication circuit configured to support a first communication protocol; a display; and at least one processor operatively connected to the first communication circuit and the display, wherein the at least one processor is configured to: configure a cluster with at least one external electronic based on the first communication protocol device through the first communication circuit, receive through the first communication circuit, from the at least one external electronic device, information identifying at least one short-range communication device connected to the at least one external electronic device via a second communication protocol, and control the display to display at least one indicator of the at least one short-range communication device based on the information received from the at least one external electronic device.

According to certain embodiments, an electronic device comprises a first communication circuit configured to support a first communication protocol; a second communication circuit configured to support a second communication protocol; and at least one processor operatively connected to the first communication circuit and the second communication circuit, wherein the at least one processor is configured to: establish a connection via the second communication protocol with at least one short-range communication device using the second communication circuit, configure a cluster via the first communication protocol with an external electronic device through the first communication circuit, generate information identifying the at least one short-range communication device connected via the second communication protocol, and transmit the generated information of the at least one short-range communication device to the external electronic device through the first communication circuit.

According to certain embodiments, a method for obtaining information of a short-range communication device using an electronic device supporting a proximity communication service, comprises configuring a cluster with at least one external electronic device through a first communication circuit based on a first communication protocol; receiving, through the first communication circuit, from the at least one external electronic device, information identifying at least one short-range communication device connected based on a second communication protocol with the at least one external electronic device; and displaying at least one indicator indicating the at least one short-range communication device based on the information received from the at least one external electronic device.

According to certain embodiments, a method for obtaining information of a short-range communication device using an electronic device supporting a proximity communication service, comprises: establishing a connection via a second communication protocol with at least one short-range communication device through a second communication circuit; configuring a cluster via a first communication protocol with an external electronic device through a first communication circuit; generating information identifying the at least one short-range communication device connected via the second communication protocol; and transmitting the generated information of the at least one short-range communication device to the at least one external electronic device through the first communication circuit.

Effects that can be obtained in the disclosure are not limited to the above-described effects, and other unmentioned effects can be clearly understood by those of ordinary skill in the art to which the disclosure pertains from the following description.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

In order to perform a NAN communication and a communication excluding the NAN communication (e.g., Bluetooth, near field communication (NFC), and/or Wi-Fi direct) with an external electronic device, an electronic device should search for the external electronic device by activating the NAN communication supporting this and the communication excluding the NAN. Further, for a communication connection with the searched external electronic device, the electronic device should enter a pairing mode, or should perform inquiry and paging operations. This is inconvenient to the user.

The electronic device according to certain embodiments of the disclosure can receive, from at least one external electronic device connected through the NAN communication, and display information on the at least one external electronic device and at least one short-range communication device connected through the communication excluding the NAN communication.

The electronic device according to certain embodiments of the disclosure can receive the information of the at least one short-range communication device from the at least one external electronic device connected through the NAN communication.

The electronic device according to certain embodiments of the disclosure can receive the information of the at least one short-range communication device connected to the at least one external electronic device through the communication excluding the NAN communication from the at least one external electronic device connected through the NAN communication, and thus can increase usability of the at least one external electronic device and the at least one short-range communication device.

Figure 1:
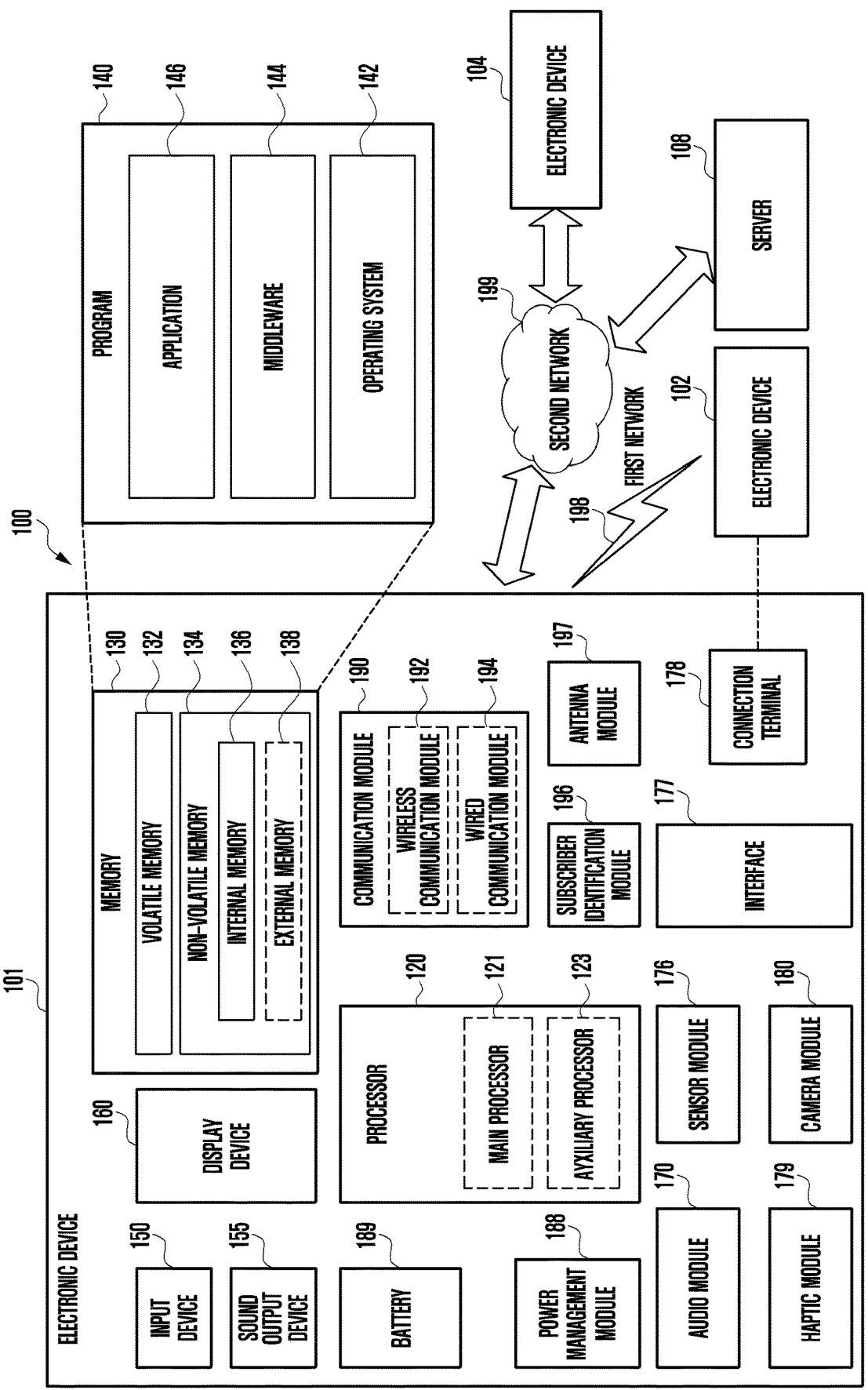
FIG. 1 is a block diagram of an electronic device in a network environment according to certain embodiments.

FIG. 1 is a block diagram of an electronic device 101 in a network environment according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
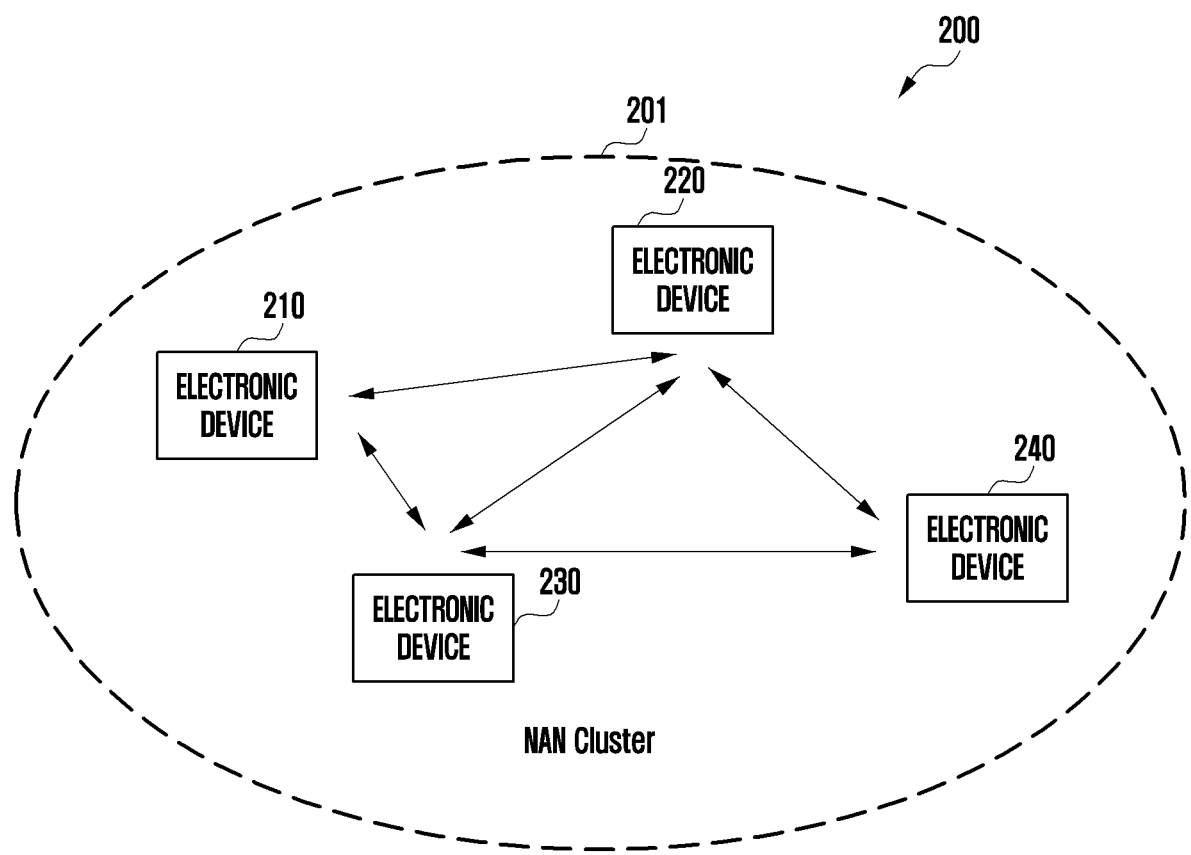
FIG. 2 is a diagram explaining an example of a system configuration according to certain embodiments.

FIG. 2 is a diagram 200 explaining an example of a system configuration according to certain embodiments.

For example, FIG. 2 may show a configuration example of a neighbor awareness networking (NAN) cluster 201 for a proximity network according to certain embodiments. In the following description, the cluster 201 may mean a set of electronic devices 210, 220, 230, and 240 constituting a proximity network so that the electronic devices (or NAN devices) 210, 220, 230, and 240 can mutually transmit and receive data. For example, the cluster 201 may be called a NAN cluster in accordance with NAN standards.

With reference to FIG. 2, the cluster 201 may be composed of the plurality of electronic devices 210, 220, 230, and 240. The electronic devices 210, 220, 230, and 240 included in the cluster 201 may transmit and receive beacons (or discovery beacons) and service discovery frames (SDFs) (hereinafter referred to as "SDFs") in a synchronized time duration (or communication duration) (e.g., discovery window (DW)). For example, the electronic devices 210, 220, 230, and 240 in the cluster 201 have time clocks synchronized with each other, and thus they can send and receive beacons and SDFs to and from each other in the same discovery window. According to an embodiment, an electronic device supporting a NAN based low-power near field communication technology may broadcast discovery signals (e.g., beacons) for discovering another electronic device in each predetermined first interval (e.g., about 100 msec), and it may receive a discovery signal being broadcasted from the other electronic device by performing scanning in each predetermined second interval (e.g., about 10 msec). According to an embodiment, an electronic device may recognize at least one other electronic device located around the electronic device based on the discovery signal received through the scanning, and it may perform time and channel synchronization with the recognized at least one other electronic device.

For example, as exemplified in FIG. 2, each of the plurality of electronic devices 210, 220, 230, and 240 may form one cluster 201 by transmitting and receiving beacons to and from the other electronic devices 210, 220, 230, and 240, and the electronic devices 210, 220, 230, and 240 in the cluster 201 may perform time and channel synchronization.

In an embodiment, the time and channel synchronization may be performed based on the time and channel of the electronic device having the highest master preference in the cluster 201. For example, the electronic devices 210, 220, 230, and 240 in the cluster 201 formed through the discovery may exchange signals for master preference information indicating the preference for operating as an anchor mater with each other, and through the exchanged signals, they may determine the electronic device having the highest master preference as the anchor mater (or master device).

According to an embodiment, the anchor mater may mean the electronic device that becomes the basis of the time and channel synchronization of the electronic devices 210, 220, 230, and 240 in the cluster 201. The anchor master may be changed in accordance with the master preference of the electronic device. According to an embodiment, in the discovery window (or discovery interval) being repeated in accordance with a predetermined interval, each of the time/channel-synchronized electronic devices 210, 220, 230, and 240 may transmit and receive the beacons and the SDFs to and from the other electronic devices.

According to an embodiment, the beacons may be periodically transmitted and received for each discovery window in order to continuously keep the time and channel synchronization of the electronic devices 210, 220, 230, and 240 in the cluster 201.

According to an embodiment, the SDFs may be transmitted and received in the discovery window in accordance with the necessity to provide services with the discovered electronic devices 210, 220, 230, and 240. According to an embodiment, among the time/channel-synchronized electronic devices 210, 220, 230, and 240, the electronic device operating as the anchor master may transmit the beacons in an interval between the discovery windows to detect a new electronic device.

According to an embodiment, each of the electronic devices 210, 220, 230, and 240 in the cluster 201 may reduce current consumption in a manner that it operates in an active state only during the discovery window and it operates in a low-power state (e.g., sleep state) during the remaining interval excluding the discovery window. For example, the discovery window corresponds to a time (e.g., millisecond) in which the electronic device is in the active state (or awake state) to cause much current consumption, whereas the interval excluding the discovery window corresponds to a time when the electronic device keeps the sleep state to make the low-power discovery possible. Accordingly, the electronic devices 210, 220, 230, and 240 in the cluster 201 may be simultaneously activated at a start time (e.g., DW start) of the discovery window synchronized through the time synchronization, and they may be simultaneously switched to the sleep state at an end time (e.g., DW end) of the discovery window.

According to an embodiment, the electronic devices 210, 220, 230, and 240 included in the cluster 201 may perform discovery, synchronization, and data exchange operations using a protocol illustrated in FIG. 3 to be described later.

Figure 3:
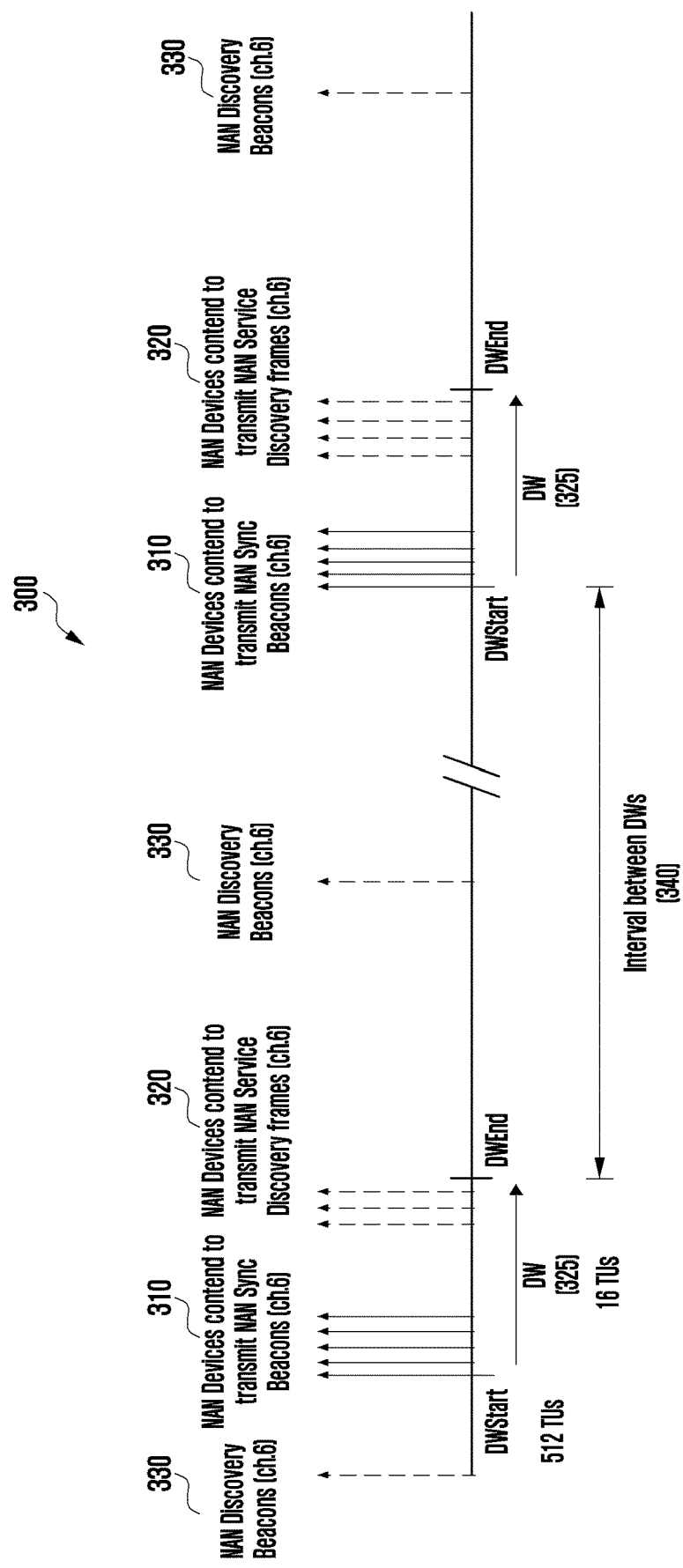
FIG. 3 is a diagram illustrating an example of a signal transmission protocol in a proximity network according to certain embodiments.

FIG. 3 is a diagram 300 illustrating an example of a signal transmission protocol in a proximity network according to certain embodiments.

For example, FIG. 3 may be an exemplary diagram of a discovery window according to certain embodiments. In FIG. 3, it is exemplified that electronic devices included in one cluster (e.g., cluster 201 of FIG. 2) transmit signals through a specific channel (e.g., channel 6 (Ch 6) based on NAN standards.

With reference to FIG. 3, electronic devices included in one cluster may transmit synchronization beacons 310 and SDFs 320 in a synchronized discovery window (DW) 325. At another interval 340 excluding the discovery window 325 (e.g., interval between the discovery windows), discovery beacons 330 may be transmitted by at least one electronic device. According to an embodiment, the electronic devices may transmit the synchronization beacons 310 and the SDFs 320 based on contentions. For example, the synchronization beacons 310 and the SDFs 320 may be transmitted between the respective electronic devices belonging to the cluster based on the contentions. According to an embodiment, each electronic device belonging to a cluster may have a transmission priority of the beacon 310 higher than that of the SDF 320.

According to an embodiment, for data exchange between the respective electronic devices, the discovery window 325 may be an interval at which the corresponding electronic device is activated from a sleep state that corresponds to a power saving mode to a wakeup state. For example, the discovery window 325 may be divided into time units (TUs) in the unit of milliseconds. According to an embodiment, the discovery window 325 for transmitting and receiving the synchronization beacons 310 and the SDFs 320 may occupy 16 time units (TUs), and it may have a cycle (or interval) being repeated with 512 time units (TUs).

According to an embodiment, the discovery beacon 330 may indicate a signal that is transmitted so that other electronic devices that are unable to join the cluster can discover the cluster. For example, the discovery beacon 330 is a signal for notifying of the existence of the cluster, and the electronic devices that do not join the cluster may discover and join the cluster by receiving the discovery beacons 330 through performing of passive scan.

According to an embodiment, the discovery beacon 330 may include information that is necessary for synchronization with the cluster. For example, the discovery beacon 330 may include at least one of a frame control (FC) field indicating a function of a signal (e.g., beacon), a broadcast address, a media access control (MAC) address of a transmission electronic device, a cluster identifier (ID), a sequence control field, a time stamp for a beacon frame, a beacon interval indicating a transmission interval of the discovery beacon 330, or capability information for the transmission electronic device. According to an embodiment, the discovery beacon 330 may include an information element related to at least one proximity network (or cluster). In an embodiment, the information related to the proximity network may be called attribute information.

According to an embodiment, the synchronization beacon 310 may represent a signal for keeping the synchronization between the synchronized electronic devices in the cluster. The synchronization beacon 310 may be transmitted by a synchronization device among the electronic devices in the cluster. For example, the synchronization device may include an anchor master device defined in the NAN standards, a master device, or a non-master sync device.

According to an embodiment, the synchronization beacon 310 may include information required for the synchronization of the electronic devices in the cluster. For example, the synchronization beacon 310 may include at least one of an FC field indicating the function of the signal (e.g., beacon), a broadcast address, a MAC address of a transmission electronic device, a cluster identifier, a sequence control field, a time stamp for a beacon frame, a beacon interval indicating an interval between start points of the discovery window 325, or capability information for the transmission electronic device. According to an embodiment, the synchronization beacon 310 may include an information element related to at least one proximity network (or cluster). For example, the proximity network related information may include content for a service provided through the proximity network.

According to an embodiment, the SDF 320 may represent a signal for exchanging data through the proximity network. According to an embodiment, the SDF 320 may represent a vender specific public action frame, and it may include various fields. For example, the SDF 320 may include a category or an action field, and it may include at least one piece of proximity network related information.

As described above, the synchronization beacon 310, the SDF 320, and the discovery beacon 330 may include the proximity network related information. In an embodiment, the proximity network related information may include an identifier indicating the kind of information, a length of information, and a body field that is corresponding information. According to an embodiment, the corresponding information may include at least one of master indication information, cluster information, service identifier list information, service descriptor information, connection capability information, wireless LAN infrastructure information, peer-to-peer (P2P) operation information, independent basic service set (IBSS) information, mesh information, further proximity network service discovery information, further availability map information, country code information, ranging information, cluster discovery information, or vender specific information.

Figure 4:
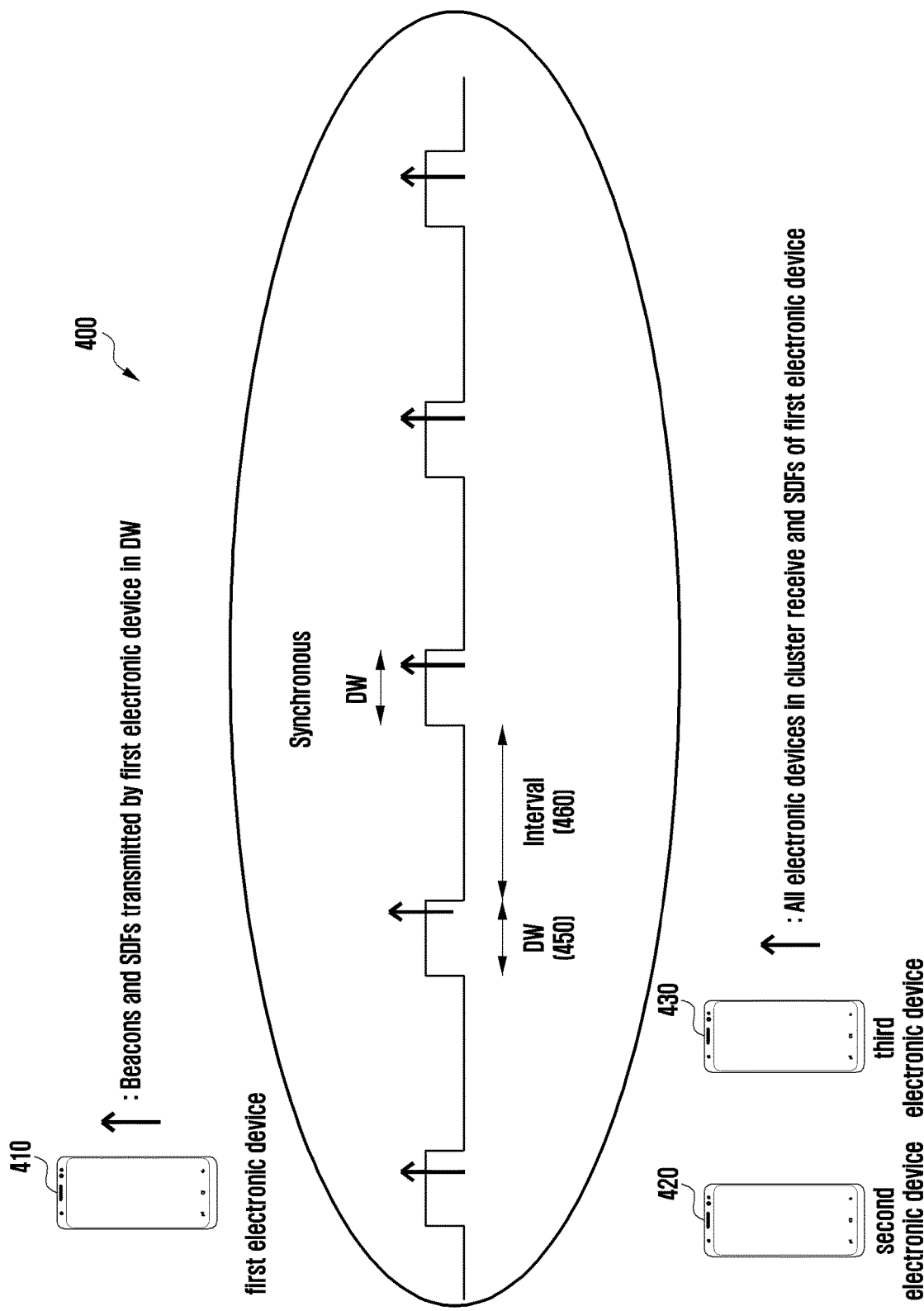
FIG. 4 is a diagram illustrating an example of data transmission and reception in a cluster according to certain embodiments.

FIG. 4 is a diagram 400 illustrating an example of data transmission and reception in a cluster according to certain embodiments.

For example, FIG. 4 shows an example in which a first electronic device 410, a second electronic device 420, and a third electronic device 430 form one cluster (e.g., NAN cluster 201 of FIG. 2) through near field communication technology, and the respective electronic devices 410, 420, and 430 may transmit and receive beacons and/or SDFs to and from each other. According to an embodiment, in FIG. 4, it may be exemplified that among the electronic devices 410, 420, and 430 constituting the cluster, the first electronic device 410 serves as the master electronic device.

With reference to FIG. 4, the first electronic device 410 may transmit beacons and SDFs in the discovery window 450. According to an embodiment, the first electronic device 410 may broadcast the beacons and SDFs in each discovery window 450 being repeated at each predetermined interval (e.g., interval 460).

According to an embodiment, the second electronic device 420 and the third electronic device 430 may receive the beacons and the SDFs transmitted by the first electronic device 410. According to an embodiment, the second electronic device 420 and the third electronic device 430 may receive the beacons and the SDFs being broadcasted from the first electronic device 410 in each discovery window 450.

According to an embodiment, the beacon being transmitted in the discovery window 450 may represent the synchronization beacon, and it may include information for keeping the synchronization between the electronic devices 410, 420, and 430. For example, if the electronic devices 410, 420, and 430 are included in the cluster, the master electronic device (e.g., first electronic device 410) may be synchronized with the time clock, and thus the discovery window 450 may be activated at the same time.

According to an embodiment, at an interval (e.g., interval 460) excluding the discovery window 450, the electronic devices 410, 420, and 430 may keep a sleep state in order to reduce current consumption. For example, the electronic devices 410, 420, and 430 can reduce the current consumption by operating in an awake state only at an interval of the discovery window 450 based on the synchronized time clock.

Figure 5:
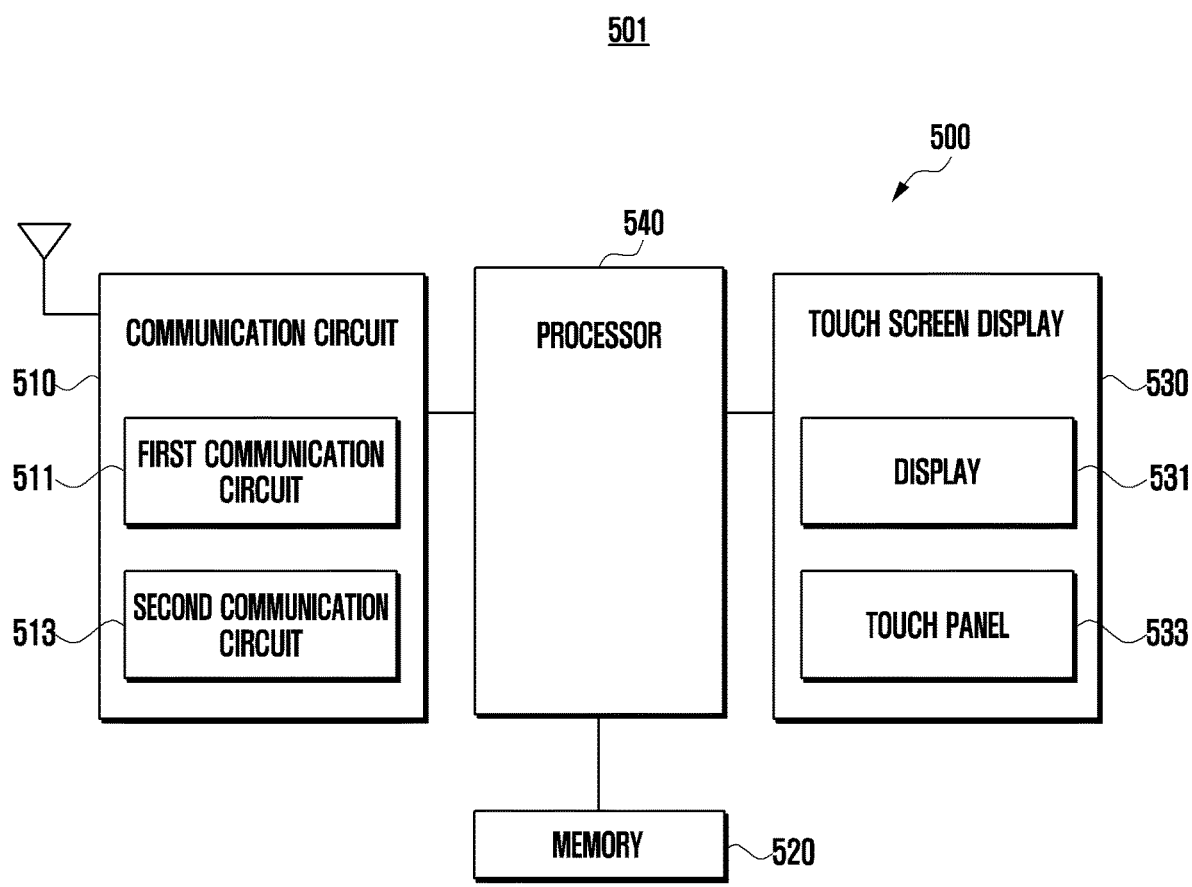
FIG. 5 is a block diagram illustrating an electronic device according to certain embodiments.

FIG. 5 is a block diagram 500 illustrating an electronic device 501 according to certain embodiments.

With reference to FIG. 5, an electronic device 501 (e.g., electronic device 101 of FIG. 1) may include a communication circuit 510 (e.g., communication module 190 of FIG. 1), a memory 520 (e.g., memory 130 of FIG. 1), a touch screen display 530 (e.g., display device 160 of FIG. 1), and a processor 540 (e.g., processor 120 of FIG. 1). The term "processor" shall be understood to refer to both the singular and plural contexts.

According to an embodiment, the communication circuit 510 (e.g., communication module 190 of FIG. 1) may include a first communication circuit 511 and a second communication circuit 513. In an embodiment, the first communication circuit 511 may support a first communication protocol, and the second communication circuit 513 may support a second communication protocol. For example, the first communication protocol may include a low-power short-range communication (e.g., Wi-Fi aware) based on neighbor awareness networking (NAN). The second communication protocol may include a short-range communication that is different from the first communication protocol. The second communication protocol can include any one of Bluetooth, Bluetooth low energy (BLE), near field communication (NFC), Wi-Fi direct, global navigation satellite system (GNSS), Zigbee, infrared data association (IrDA), radio frequency identification (RFID), ad-hoc, ultra wideband (UWB), and/or hotspot).

According to an embodiment, the memory 520 (e.g., memory 130 of FIG. 1) may store a program for supporting the configuration of a cluster based on a first communication protocol with at least one external electronic device through the first communication circuit 511. The memory 520 may store a program for receiving, through the first communication circuit 511, and displaying information (such as at least one indicator that indicates) about at least one short-range communication device that is connected via the second protocol with the at least one external electronic device. In certain embodiments, the memory 520 may store a program for displaying the information (such as at least one other indicator) of the at least one other short-range communication device connected (or searched for) via the second protocol with the electronic device 501. In certain embodiments, the memory 520 may store a program for displaying the information (such as at least one other indicator) of at least one other short-range communication device that is connectable, or connected and connectable via the second protocol with the electronic device 501.

The touch screen display 530 (e.g., display device 160 of FIG. 1) may be integrally configured to include a display 531 and a touch panel 533. The touch screen display 530 displays an image under the control of the processor 540, and may be implemented by any one of a liquid crystal display (LCD), a light-emitting diode (LED) display, an organic light-emitting diode (OLED) display, or micro electromechanical system (MEMS) display, or an electronic paper display. However, the touch screen display is not limited thereto.

The display 531 may display a screen for configuring a short-range communication (e.g., Bluetooth communication) under the control of the processor 540. The display 531 may display at least one indicator indicating at least one short-range communication device based on information received from at least one external electronic device in the cluster. The display 531 may further display at least one other indicator indicating at least one short-range communication device connected, or connectable, or both based on the second communication protocol under the control of the processor 540. In certain embodiments, the at least one indicator and the at least one other indicator can selectable objects that correspond to particular ones of the at least one short-range communication device and the at least one other short-range communication device. The touch panel 533 may detect a user input for selecting at least one short-range communication device displayed on the display 531 and/or a user input (e.g., user input related to service execution) to control the short-range communication device under the control of the processor 540.

According to an embodiment, the processor 540 (e.g., processor 120 of FIG. 1) may control the overall operation of the electronic device 501 and a signal flow between internal constituent elements of the electronic device 501, perform data processing, and control power supply from a battery (battery 189 of FIG. 1) to the constituent elements.

In an embodiment, the processor 540 may configure a cluster based on the first communication protocol with at least one external electronic device through the first communication circuit 511. The processor 540 may receive through the first communication circuit 511, from the at least one external electronic device, information of (such as information identifying) at least one short-range communication device connected with the at least one external electronic device in the cluster. The information identifying the at least one short-range communication device received from the at least one external electronic device may include at least one of address information, capability information, location information, identification information (e.g., name) of the short-range communication device, attributes (e.g., type and specification), status information (e.g., on/off), battery residual quantity information, communication strength information, or communication protocol type information. The processor 540 may display at least one indicator of the at least one short-range communication device on the display 531 based on the information received from the at least one external electronic device. The at least one indicator can include at least one selectable object corresponding to particular ones of the at least one short-range communication device.

When a user input for selecting a short-range communication device for executing a specific service among the at least one short-range communication device displayed on the display 531 is detected, the processor 540 may transfer data related to the specific service to the selected short-range communication device through the external electronic device communication-connected with the selected short-range communication device. In certain embodiments, the user input selecting the short-range communication device can be a touch input of an object corresponding to the selected short-range communication device.

In an embodiment, the processor 540 may perform a search operation to identify whether at least one short-range communication device based on the second communication protocol exists through the second communication circuit 513. The processor 540 may determine whether to establish a connection based on the second communication protocol with the at least one other short-range communication device. It is noted that the at least one other short-range communication device can be, but is not necessarily, the same as the at least one short-range communication device that are connected to the external electronic device. Moreover, the at least one other short-range communication device and the at least one short-range communication device can overlap. If the connection based on the second communication protocol with the at least one short-range communication device is made through the second communication circuit 513, the processor 540 may display an indicator of the at least one short-range communication device connected via the second communication protocol with the at least one external electronic device, the at least one other short-range communication device searched for based on the second communication protocol, and/or the at least one short-range communication device making the connection based on the second communication protocol with the electronic device 501 that are indicated on the display 531.

The processor 540 may separately display the at least one indicator indicating the short-range communication device connected based via on the second communication protocol with the at least one other indicator indicating the at least one other external electronic device and the at least one short-range communication device making the connection based on the second communication protocol with the electronic device 501 on the display 531.

According to an embodiment, an electronic device 501 comprising: a first communication circuit 511 configured to support a first communication protocol, a display 531, and a processor 540 operatively connected to the first communication circuit 511 and the display 531, wherein the processor 540 is configure a cluster with at least one external electronic based on the first communication protocol through the first communication circuit 511, receive through the first communication circuit 511, from the at least one external electronic device, information identifying at least one short-range communication device connected to the at least one external electronic device via a second communication protocol, and control the display 531 to display at least one indicator of the at least one short-range communication device based on the information received from the at least one external electronic device According to certain embodiments, the first communication protocol supports a low-power short-range communication based on neighbor awareness networking (NAN), and the second communication protocol supports a different short-range communication from the first communication protocol.

According to an embodiment, the electronic device 501 further comprises a second communication circuit 513 supporting the second communication protocol, wherein the processor 540 is configured to: search for at least one other short-range communication device based on the second communication protocol through the second communication circuit, and control the display 531 to display at least one other indicator indicating the at least one other short-range communication device.

According to certain embodiments, control the display to display at least one other indicator indicating the at least one other short-range communication device comprises control the display to separately display the at least other indicator of the at least one other short-range communication device with the at least one indicators of the at least one external electronic device and the at least one searched short-range communication device.

According to certain embodiments, the processor 540 is configured to transmit a request for a search for the at least one short-range communication device to the at least one external electronic device through the first communication circuit 511.

According to certain embodiments, when an input for selecting one of the at least one indicators indicating of the at least one short-range communication device is detected, the processor 540 is configured to transmit a signal to a selected short-range communication device among the at least one external electronic device and the external electronic device through the first communication circuit.

According to an embodiment, an electronic device 501 comprising: a first communication circuit 511 configured to support a first communication protocol, a second communication circuit 513 configured to support a second communication protocol, and a processor 540 operatively connected to the first communication circuit 511 and the second communication circuit 513, wherein the processor 540 is configured to: establish a connection based on the second communication protocol with at least one short-range communication device through the second communication circuit 513, configure a cluster based on the first communication protocol with at least one external electronic device through the first communication circuit 511, generate information of the at least one short-range communication device connected based on the second communication protocol, and transmit the generated information of the at least one short-range communication device to the at least one external electronic device through the first communication circuit 511.

According to an embodiment, the information of the at least one short-range communication device comprises at least one of address information, capability information, location information, identification information, a device type, status information, battery residual quantity information, communication strength information, or communication protocol type information.

According to an embodiment, in case that a signal for requesting information of the at least one short-range communication device is received from the at least one external electronic device through the first communication circuit 511, the processor 540 is configured to generate the information of the at least one short-range communication device connected based on the second communication protocol and to transmit the information to the at least one external electronic device having requested the information through the first communication circuit 511.

According to an embodiment, in case that a signal for requesting a search for the at least one short-range communication device is received from the at least one external electronic device through the first communication circuit 511, the processor 540 is configured to generate at least one of the information of the at least one short-range communication device connected based on the second communication protocol or the information of the at least one short-range communication device in which a strength of a received communication signal exceeds a designated value and to transmit the generated information to the at least one external electronic device having requested the search through the first communication circuit 511.

Figure 6:
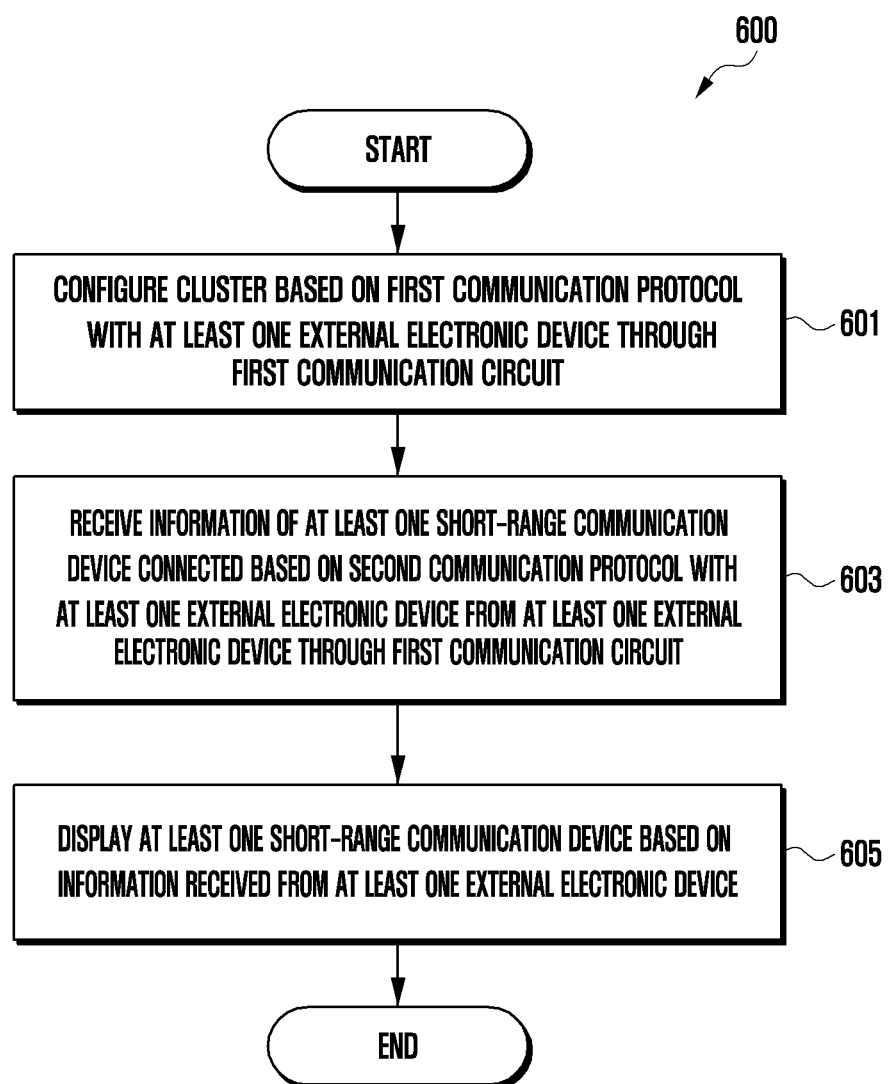
FIG. 6 is a flowchart explaining a method for obtaining and displaying information of a short-range communication device connected to an electronic device supporting a proximity communication service according to certain embodiments.

FIG. 6 is a flowchart 600 explaining a method for obtaining and displaying information of a short-range communication device connected to an electronic device supporting a proximity communication service according to certain embodiments.

With reference to FIG. 6, the electronic device (e.g., electronic device 501 of FIG. 5), at operation 601, may configure the cluster based on the first communication protocol with at least one external electronic device through the first communication circuit (e.g., first communication circuit 511 of FIG. 5). The first communication protocol may support a low-power short-range communication (e.g., Wi-Fi aware) based on neighbor awareness networking (NAN).

In an embodiment, if at least one external electronic device is detected through Bluetooth low energy (BLE), or execution of a proximity communication service (e.g., execution of a service (e.g., IoT service) based on the Bluetooth communication) is detected, the electronic device 501 may activate a communication function (e.g., NAN-based low-power short-range communication function) for supporting the first communication protocol, and may configure the cluster (e.g., cluster 201 of FIG. 2) with the at least one external electronic device around the electronic device.

For example, according to the above-described embodiment of FIG. 2, the electronic device 501 supporting the low-power short-range communication may broadcast a search signal (e.g., discovery beacon) for discovering at least one external electronic device in each first predetermined period (e.g., about 100 msec), and may receive the search signal being broadcasted from the at least one external electronic device by performing scanning in each second predetermined period (e.g., about 10 msec). The electronic device 501 may identify the at least one external electronic device located around the electronic device 501 based on the received search signal through the scanning, and may configure the cluster 201 with the identified external electronic device. The electronic devices (e.g., electronic device 501 and at least one external electronic device) in the cluster 201 may perform time and channel synchronization. The electronic device 501 and the at least one external electronic device, of which the time and channel have been synchronized, may send and receive information (e.g., beacon and SDF) through the same discovery window.

In an embodiment, the electronic device 501 may configure the cluster with at least one external electronic device that satisfies a designated condition. For example, the electronic device 501 may identify the designated condition including account information, contact information, a service being executed, a supportable service, and/or a proximity service request from a user of the electronic device, and may configure the cluster with the at least one external electronic device that satisfies the designated condition.

The cluster configuration is not limited thereto, and in an embodiment, in case that the electronic device 501 is located in a designated place, the electronic device 501 may activate the NAN-based low-power short-range communication function, and may configure the cluster with at least one external electronic device around the electronic device. The designated place may include a place designated by a user. For example, the designated place may include a house, an office, a reserved place located at a reserved time (e.g., restaurant, uber, hospital, art gallery, or movie theater), or location information registered in a schedule.

In an embodiment, the electronic device 501, at operation 603, may receive, through the first communication circuit 511, information identifying at least one short-range communication device connected with the at least one external electronic device via the second communication protocol, from the at least one external electronic device.

In an embodiment, the information identifying the at least one short-range communication device received from the at least one external electronic device may include at least one of address information, capability information, location information, identification information (e.g., name) of the short-range communication device, attributes (e.g., type and specification), status information (e.g., on/off), battery residual quantity information, communication strength information, or communication protocol type information.

In an embodiment, the electronic device 501 may receive the information identifying at least one short-range communication device connected based on the second communication protocol with the at least one external electronic device from the at least one external electronic device based on various time points and/or conditions. For example, the electronic device 501 may receive the information of the at least one short-range communication device from the at least one external electronic device in response to the configuration of the cluster based on the first communication protocol with the at least one external electronic device through the first communication circuit.

As another example, the electronic device 501 may receive the information identifying the at least one short-range communication device from the at least one external electronic device in response to the detection of the user input for requesting the designated period or the information of the at least one short-range communication device, the sensing of the execution of the specific application or the specific function (e.g., entrance into a short-range communication (e.g., Bluetooth) configuration screen, music playback, file sharing, execution of a document preparation function, and/or execution of an Internet of things (IoT) service), or the detection of the user input for selecting the external electronic device through a user interface including the at least one external electronic device connected based on the first communication protocol.

As still another example, if the electronic device 501 is located in a designated range, the electronic device 501 may receive the information identifying the at least one short-range communication device from the at least one external electronic device. For example, the electronic device 501 may receive the information of the at least one short-range communication device from the at least one external electronic device through ultra-wideband (UWB), NFC, or wireless charging coils based on whether the electronic device 501 is located in a designated place (e.g., in a vehicle or in a house) or whether the electronic device 501 is put on a vehicle (e.g., it is determined whether the user of the electronic device 501 gets on the vehicle depending on whether the movement speed of the electronic device 501 exceeds a predetermined speed using a sensor unit (not illustrated) (e.g., acceleration sensor)).

As still another example, the electronic device 501 may transmit authentication information, such as account information or reservation information, to the external electronic device (or server), and if the authentication is identified, the electronic device may receive the information of the short-range communication device connected to the external electronic device from the external electronic device (or server).

In an embodiment, the electronic device 501, at operation 605, may display at least one indicator indicating at least one short-range communication device based on the information received from the at least one external electronic device. For example, the electronic device 501 may configure the user interface including the at least one short-range communication device based on the information of the at least one short-range communication device received from the at least one external electronic device, and may display the configured user interface on the display (e.g., display 531 of FIG. 5). As another example, the electronic device 501 may display information of the external electronic device (e.g., external electronic device connected based on the second communication protocol with the at least one short-range communication device) and the at least one short-range communication device in association with each other.

In an embodiment, the electronic device 501 may display guide information to control the at least one short-range communication device. The guide information may be displayed in case that a user input to request an output of the guide information is detected, or a designated condition (e.g., time when the user interface including the short-range communication device is first communication-connected with the selected short-range communication device) is satisfied. In an embodiment, the electronic device 501 may receive the guide information from the at least one external electronic device or the corresponding short-range communication device, and may display the received guide information. In another embodiment, the electronic device 501 may display the guide information to control the short-range communication device searched for based on the information of the short-range communication device.

In certain embodiments, although not illustrated, the electronic device 501 may detect the user input for selecting the short-range communication device for the user interface including the at least one short-range communication device displayed on the display 531 to execute a specific service. The electronic device 501 may transmit data related to the specific service to the external electronic device connected based on the second communication protocol with the selected short-range communication device through the first communication circuit 511. The external electronic device may transmit the data related to the specific service received from the electronic device 501 to the selected short-range communication device through the second communication circuit (e.g., second communication circuit 513 of FIG. 5). The selected short-range communication device may execute the specific service based on the data related to the specific service received through the external electronic device.

According to an embodiment, a method for obtaining information of a short-range communication device using an electronic device 501 supporting a proximity communication service, the method comprising: configuring a cluster based on the first communication protocol with at least one external electronic device through a first communication circuit 511, receiving, from the at least one external electronic device, information of at least one short-range communication device connected based on a second communication protocol with the at least one external electronic device through the first communication circuit 511, and displaying the at least one short-range communication device based on the information received from the at least one external electronic device.

According to an embodiment, the first communication protocol supports a low-power short-range communication based on neighbor awareness networking (NAN), and the second communication protocol supports a short-range communication different from the first communication protocol.

According to an embodiment, the method for obtaining information of a short-range communication device using an electronic device 501 supporting a proximity communication service, the method further comprising: searching for at least one other connected, connectable, or both short-range communication device through a second communication circuit 513 supporting the second communication protocol, and displaying the at least one other indicator indicating the at least one other short-range communication device.

According to an embodiment, the at least one short-range communication device connected, connectable, or both, via the second communication protocol with the at least one external electronic device and the at least one searched short-range communication device are displayed separately.

According to an embodiment, the method for obtaining information of a short-range communication device using an electronic device 501 supporting a proximity communication service, the method further comprising transmitting a signal for requesting a search for the at least one short-range communication device to the at least one external electronic device through the first communication circuit 511.

According to an embodiment, the method for obtaining information of a short-range communication device using an electronic device 501 supporting a proximity communication service, the method further comprising detecting an input for selecting one of the at least one short-range communication device displayed on a display 531 based on the received information, and transmitting a signal for the detected input to the selected short-range communication device among the at least one external electronic device and the external electronic device connected based on the second communication protocol through the first communication circuit 511.

Figure 7:
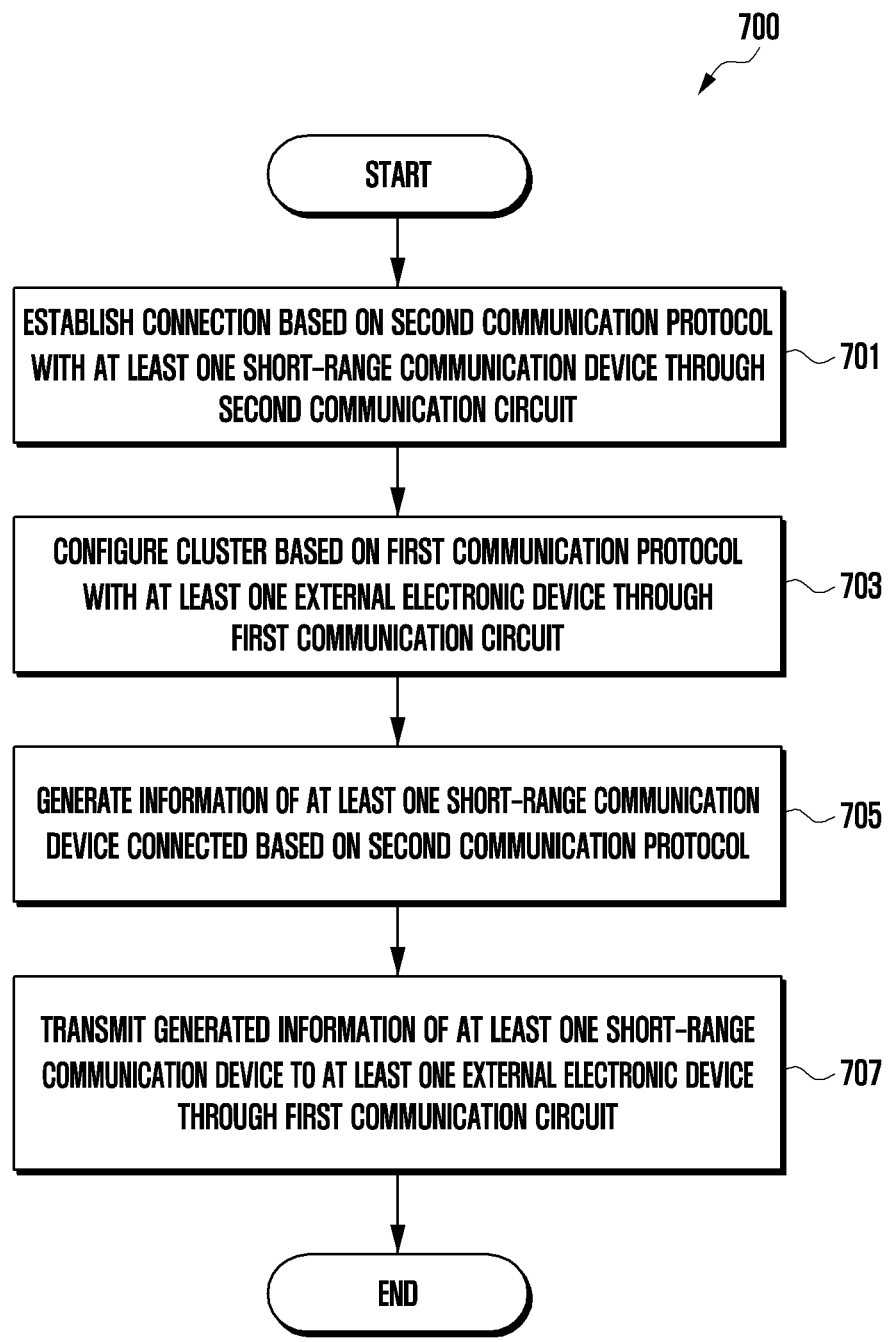
FIG. 7 is a flowchart explaining a method for generating and transmitting information of a short-range communication device connected based on a second communication protocol according to certain embodiments.

FIG. 7 is a flowchart 700 explaining a method for generating and transmitting information of a short-range communication device connected based on a second communication protocol according to certain embodiments.

With reference to FIG. 7, the electronic device (e.g., electronic device 501 of FIG. 5), at operation 701, may establish the connection based on the second communication protocol with the at least one short-range communication device through the second communication circuit (e.g., second communication circuit 513 of FIG. 5). For example, the second communication protocol may support the short-range communication excluding the NAN-based low-power short-range communication, for example, Bluetooth, Bluetooth low energy (BLE), near field communication (NFC), Wi-Fi direct, global navigation satellite system (GNSS), Zigbee, infrared data association (IrDA), radio frequency identification (RFID), ad-hoc, ultra wideband (UWB), and/or hotspot In an embodiment, the electronic device 501, at operation 703, may configure the cluster (e.g., cluster 201 of FIG. 2) based on the first communication protocol with the at least one external electronic device through the first communication circuit (first communication circuit 511 of FIG. 5). For example, the first communication protocol may support the NAN-based low-power short-range communication. According to the above-described embodiment of FIG. 2, the electronic device 501 may configure the cluster 201 with the at least one external electronic device that satisfies the designated condition (e.g., account information, contact information, a service being executed, a supportable service, and/or a proximity service request from a user).

In an embodiment, the electronic device 501, at operation 705, may generate the information of the at least one short-range communication device based on the second communication protocol. The information of the short-range communication device may include at least one of address information, capability information, location information, identification information (e.g., name) of the short-range communication device, attributes (e.g., type and specification), status information (e.g., on/off), battery residual quantity information, communication strength information, or communication protocol type information. At operation 707, the electronic device 501 may transmit the generated information of the at least one short-range communication device to the at least one external electronic device through the first communication circuit 511.

In an embodiment, the information of the at least one short-range communication device connected based on the second communication protocol with the electronic device may be exchanged through a service discovery frame (SDF).

In an embodiment, if the cluster is configured based on the first communication protocol with the at least one external electronic device, the electronic device 501 may transmit a publish type SDF within a discovery window DW.

In another embodiment, the electronic device 501 may publish the information of the at least one short-range communication device based on the second communication protocol to the at least one external electronic device existing in the cluster. For example, the electronic device 501 may publish the information of the at least one short-range communication device to the at least one external electronic device existing in the cluster regardless of the reception of the signal for requesting the information of the at least one short-range communication device from the at least one external electronic device existing in the cluster.

In still another embodiment, the electronic device 501 may publish the information of the at least one short-range communication device in response to a subscribe type SDF in the cluster. The subscribe type SDF may be transmitted within the discovery window DW to grasp the existence of the short-range communication device located around the at least one external electronic device at a time when the use of the short-range communication device is necessary. For example, the at least one external electronic device may transmit the subscribe type SDF to the at least one electronic device in the cluster at the time when the use of the short-range communication device, such as a Bluetooth speaker and/or a Bluetooth keyboard, is necessary. The at least one electronic device having received the subscribe type SDF may determine whether the at least one short-range communication device connected based on the second communication protocol exists. If the at least one connected short-range communication device exists, the corresponding electronic device may publish the information of the at least one short-range communication device to the external electronic device having transmitted the subscribe type SDF.

In an embodiment, the electronic device 501 may publish the information of the at least one short-range communication device to the at least one external electronic device existing in the cluster through a NAN SDF frame format as shown in Table 1 below. The NAN SDF frame may include fields, such as category, action, organizationally unique identifier (OUI), OUI type, and NAN attributes. Among the fields included in the NAN SDF frame, the NAN attribute field may include one or more attributes corresponding to purposes. The electronic device 501 may publish the SDF having the NAN attribute field including one or more attributes corresponding to the purposes to the at least one external electronic device existing in the cluster.

TABLE 1

| Field | Size (Octets) | Value(Hex) | Description |
| --- | --- | --- | --- |
| Category | 1 | 0x04 or 0x09 | IEEE 802.11 Public Action frame or Protected Dual of Public Action frame |
| Action | 1 | 0x09 | IEEE 802.11 Public Action frame Vendor Specific |
| OUI | 3 | 0x50-6F-9A | Wi-Fi Alliance specific OUI |
| OUI Type | 1 | 0x13 | Identifying the type and version of the NAN |
| NAN attributes | Variable | Variable | One or more NAN attributes |

For example, the one or more attributes corresponding to the purposes that may be included in the NAN attribute field may include at least one of a master indication attribute, a cluster attribute, a service ID list attribute, a service descriptor attribute, a NAN connection capability attribute, a wireless LAN (WLAN) infrastructure attribute, a peer to peer (P2P) operation attribute, an independent basic service set (IBSS) attribute, a mesh attribute, a further proximity network (NAN) service discovery attribute, a further availability map attribute, a country code attribute, a ranging attribute, a cluster discovery attribute, a service descriptor extension attribute, a device capability attribute, a NAN data path (NDP) attribute, a NAN data cluster (NDC) attribute, a NAN data link (NDL) attribute, an NDL quality of service (QoS) attribute, an unaligned schedule attribute, a ranging information attribute, a ranging setup attribute, a fine timing measurement (FTM) ranging report attribute, an element container attribute, an extended wireless LAN (WLAN) infrastructure attribute, an extended peer to peer (P2P) operation attribute, an extended independent basic service set (IBSS) attribute, an extended mesh attribute, a cipher suite info attribute, a security context info attribute, a shared-key descriptor attribute, a public availability attribute, or a vendor specific attribute.

In an embodiment, the electronic device 501 may transmit the information of the at least one short-range communication device to the at least one external electronic device existing in the cluster using the service descriptor attribute or the service descriptor extension attribute among the attributes that may be included in the above-described NAN attribute field.

In an embodiment, the format for the service descriptor attribute may be as shown in Table 2 below.

TABLE 2

| Field | Size (Octets) | Value(Hex) | Description |
| --- | --- | --- | --- |
| Attribute ID | 1 | 0x03 | Identifies the type of NAN attribute |
| Length | 2 | Variable | Length of the following fields in the attribute. |
| Service ID | 6 | Variable | Mandatory field that contains the hash of the Service Name. |
| Instance ID | 1 | Variable | Publish_ID or Subscribe_ID Value of zero is reserved |
| Requestor Instance ID | 1 | Variable | Instance ID from the frame that triggered the transmission if available, otherwise set to 0x00. |
| Service Control | 1 | Variable | Mandatory field that defines the Service Control bitmap |
| Binding Bitmap | 0 or 2 | 0x0000 to 0xFFFF | Optional field that indicates the binding of the SDA to post discovery connection attributes |
| Matching Filter Length | 0 or 1 | Variable | An optional field and present if a matching service discovery filter is used |
| Matching Filter | Variable | Variable | An optional field that is a sequence of length and value pairs that identify the matching service discovery filters |
| Service Response Filter Length | 0 or 1 | Variable | An optional field and present if a service response filter is used. |
| Service Response Filter | Variable | Variable | An optional field that identifies the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

In an embodiment, the format for the service descriptor extension attribute may be as shown in Table 3 below.

TABLE 3

| Field | Size (Octets) | Value | Description |
| --- | --- | --- | --- |
| Attribute ID | 1 | 0x0E | Identifies the type of NAN attribute |
| Length | 2 | 0 or 1 | Length of the following fields in the attribute. This is an optional field. |
| Instance ID | 1 | Variable | The same value as in the Instance ID field of the associated Service Descriptor attribute. |
| Control | 2 | Variable | Information about the fields present. |
| Range Limit | 4 | 0 or 4 | Range limit given in centimeters. This is an optional field. |
| Service Update Indicator | 1 | 0 or 2 | Monotonically increasing value indicating the current version of the service specific information corresponding to the publish instance, which may be conveyed by publish message and/or FSD messages. This is an optional field. |
| Service Info Length | 0 or 2 | Variable | Length of the Service Info field. An optional field and present if Service Info field is present. |
| Service Info | Variable | Variable | An optional field that contains the service specific information. |

In an embodiment, the format for the service descriptor attribute in Table 2 and the format for the service descriptor extension attribute in Table 3 may include the service info field capable of defining the service specific information.

In an embodiment, the information of the at least one short-range communication device connected based on the second communication protocol with the electronic device may be included in the service info field. The electronic device 501 may define the information of the at least one short-range communication device in the service info field, and may transmit the SDF including the service descriptor attribute defining this or the service descriptor extension attribute to the at least one external electronic device exiting in the cluster through the first communication circuit 511.

According to an embodiment, it has been described that the service info field includes the information of the at least one connected short-range communication device, but the service info field is not limited thereto. For example, the service information field may further include action type information including an operation to be performed by the electronic device. The action type for the operation to be performed by the electronic device, which has a certain value, may be a value engaged between the electronic devices having the same service. For example, the action type may be a value indicating that the information of the short-range communication device is being searched for in case that a specific electronic device among electronic devices constituting the cluster transmits a subscribe message to at least one electronic device existing in the cluster excluding the specific electronic device in order to search for the communication device located in a short range. In response to the subscribe message received from the specific electronic device, at least one electronic device having the same designated value as that of the action type among the at least one electronic device existing in the cluster may publish the information of the at least one short-range communication device connected to the electronic device having transmitted the subscribe message.

In an embodiment, the electronic device 501 may identify whether the state of the connected short-range communication device is changed at designated time intervals. For example, the state of the short-range communication device may include a state where the connection with the electronic device 501 is maintained, a state where the connection with the electronic device 501 is released, and/or a state where a new short-range communication device is searched for. If the state of the short-range communication device is changed, the electronic device 501 may transmit the information of the short-range communication device including the changed state to the at least one external electronic device existing in the cluster.

In FIG. 7 according to an embodiment, although it has been described that the electronic device 501 establishes the connection based on the second communication protocol with the at least one short-range communication device at operation 701, and then configures the cluster based on the first communication protocol with the at least one external electronic device at operation 703, the operation of the electronic device is not limited thereto. For example, the electronic device 501 may configure the cluster with the at least one external electronic device based on the first communication protocol at operation 703, and then may establish the connection based on the second communication protocol with the at least one short-range communication device at operation 701.

According to an embodiment, although it has been described that the electronic device 501 configures the cluster with the at least one external electronic device at operation 703, and then generates and transmits the information of the short-range communication device, the operation of the electronic device is not limited thereto. For example, the electronic device 501 may perform a search operation to identify whether the short-range communication device is located around the electronic device 501 for each designated period. If at least one new short-range communication device is searched for by the search operation, the electronic device 501 may generate and transmit information of the at least one new searched short-range communication device. As another example, if a signal for requesting the information of the at least one short-range communication device is received from the external electronic device, the electronic device 501 may generate and transmit the information of the at least one short-range communication device based on the second communication protocol. As still another example, if a signal for requesting the information of the at least one short-range communication device is received from the external electronic device, the electronic device 501 may generate and transmit not only the information of the connected short-range communication device but also the information of the short-range communication device located adjacent to the external electronic device (e.g., short-range communication device having a communication signal strength that exceeds a designated value) searched for through the search operation (e.g., search operation for identifying whether the short-range communication device is located around the electronic device 501).

According to an embodiment, a method for obtaining information of a short-range communication device using an electronic device 501 supporting a proximity communication service, the method comprising: establishing a connection based on a second communication protocol with at least one short-range communication device through a second communication circuit 513, configuring a cluster based on a first communication protocol with at least one external electronic device through a first communication circuit 511, generating information of the at least one short-range communication device connected based on the second communication protocol, and transmitting the generated information of the at least one short-range communication device to the at least one external electronic device through the first communication circuit 511.

According to an embodiment, the information of the at least one short-range communication device comprises at least one of address information, capability information, location information, identification information, a device type, status information, battery residual quantity information, communication strength information, or communication protocol type information.

According to an embodiment, the method for obtaining information of a short-range communication device using an electronic device 501 supporting a proximity communication service, the method further comprising: receiving a signal for requesting information of the at least one short-range communication device from the at least one external electronic device through the first communication circuit 511, and generating the information of the at least one short-range communication device connected based on the second communication protocol, and transmitting the information to the at least one external electronic device having requested the information through the first communication circuit 511.

According to an embodiment, the method for obtaining information of a short-range communication device using an electronic device 501 supporting a proximity communication service, the method further comprising: receiving a signal for requesting a search for the at least one short-range communication device from the at least one external electronic device through the first communication circuit 511, and generating at least one of the information of the at least one short-range communication device connected based on the second communication protocol or the information of the at least one short-range communication device in which a strength of a received communication signal exceeds a designated value, and transmitting the generated information to the at least one external electronic device having requested the search through the first communication circuit 511.

Figure 8:
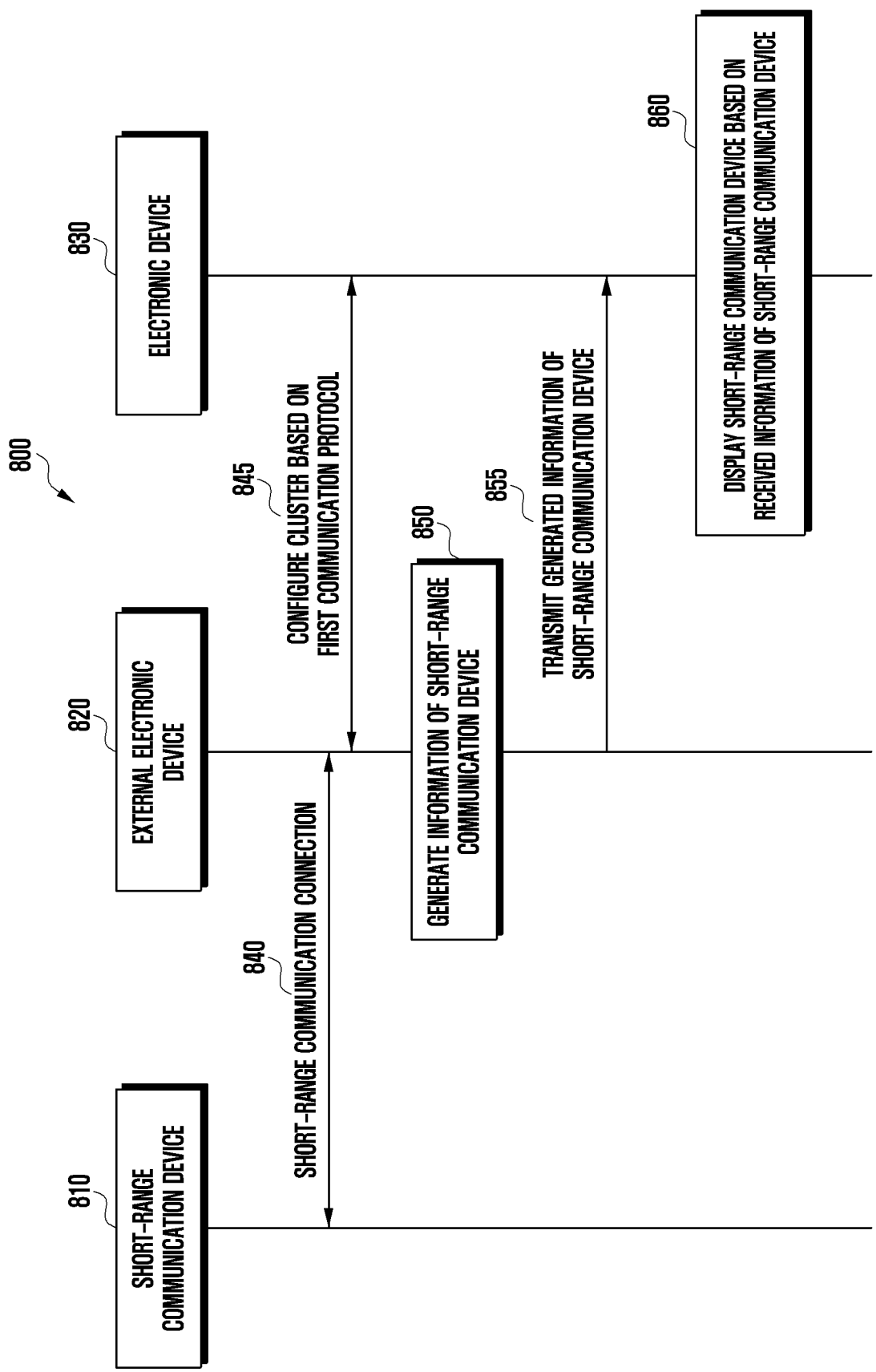
FIG. 8 is a diagram illustrating signal flows among a short-range communication device, an external electronic device, and an electronic device according to certain embodiments.

FIG. 8 is a diagram 800 illustrating signal flows among a short-range communication device 810, an external electronic device 820, and an electronic device 830 according to certain embodiments.

With reference to FIG. 8, a short-range communication device 810 and an external electronic device 820, at operation 840, may be connected with each other through short-range communication. For example, the short-range communication connection may include a communication connection based on the second communication protocol including the short-range communication in addition to the NAN-based low-power short-range communication. For example, in addition to the NAN-based low-power short-range communication, the second communication protocol may include the short-range communication (e.g., Bluetooth, Bluetooth low energy (BLE), near field communication (NFC), Wi-Fi direct, global navigation satellite system (GNSS), Zigbee, infrared data association (IrDA), radio frequency identification (RFID), ad-hoc, ultra wideband (UWB), and/or hotspot).

In FIG. 8 according to an embodiment, although it has been described that the external electronic device 820 is connected to one short-range communication device 810 through the short-range communication, the connection of the external electronic device is not limited thereto. For example, the external electronic device 820 may be connected to a plurality of short-range communication devices including the short-range communication device 810 through the short-range communication.

In an embodiment, the external electronic device 820 and the electronic device 830, at operation 845, may configure the cluster based on the first communication protocol. For example, the first communication protocol may include the NAN-based low-power short-range communication (e.g., Wi-Fi aware). In an embodiment, if execution of a proximity communication service is detected, or if the electronic device 830 is located in a designated place, the electronic device 830 may configure the cluster with the external electronic device 820.

In an embodiment, the electronic device 830 may request information identifying at least one short-range communication device from at least one external electronic device, that is, the external electronic device 820, in response to the detection of a user input requesting a designated period or the information of the at least one short-range communication device, the detection of execution of a specific application or a specific function, the location of the electronic device 501 in a designated place, or the detection of the user input for selecting the external electronic device through a user interface including the at least one external electronic device connected based on the first communication protocol.

In an embodiment, the external electronic device 820, at operation 850, may generate information of the short-range communication device 810. In an embodiment, the external electronic device 820, at operation 855, may transmit the generated information of the short-range communication device 810 to the electronic device 830 through the first communication circuit (e.g., first communication circuit 511 of FIG. 5).

In an embodiment, the electronic device 830, at operation 860, may display an indicator indicating the short-range communication device 810 on the display (e.g., display 531 of FIG. 5) based on the information of the short-range communication device 810 received from the external electronic device 820. For example, the electronic device 810 may display identification information (e.g., name) of the short-range communication device 810, attributes (e.g., type and specification), status information (e.g., on/off), battery residual quantity information, communication strength information, or communication protocol type information, and/or may display the short-range communication device 810 and the external electronic device 820 connected based on the second communication protocol in association with each other.

In an embodiment, when a user input selects one of the displayed short-range communication device(s) 810, the electronic device 830 may transmit data related to the execution of the specific service to the selected short-range communication device 810 through the external electronic device 820. In certain embodiments, the user input selecting one of the displayed short-range communication device(s) can be a touch input of an object associated with the selected short-range communication device. The data transmission by the electronic device 830 is not limited thereto, and if the electronic device 830 is located within a designated range, the electronic device 830 may transmit the data related to the execution of the specific service to the short-range communication device 810 through the external electronic device 820.

In an embodiment, the short-range communication device 810, at operation 840, may generate not only information of the communication-connected short-range communication device but also information of the short-range communication device located adjacent to the external electronic device 820 (e.g., short-range communication device having a communication signal strength that exceeds a designated value), and may transmit the generated information to the electronic device 830 through the first communication circuit 511.

Figure 9:
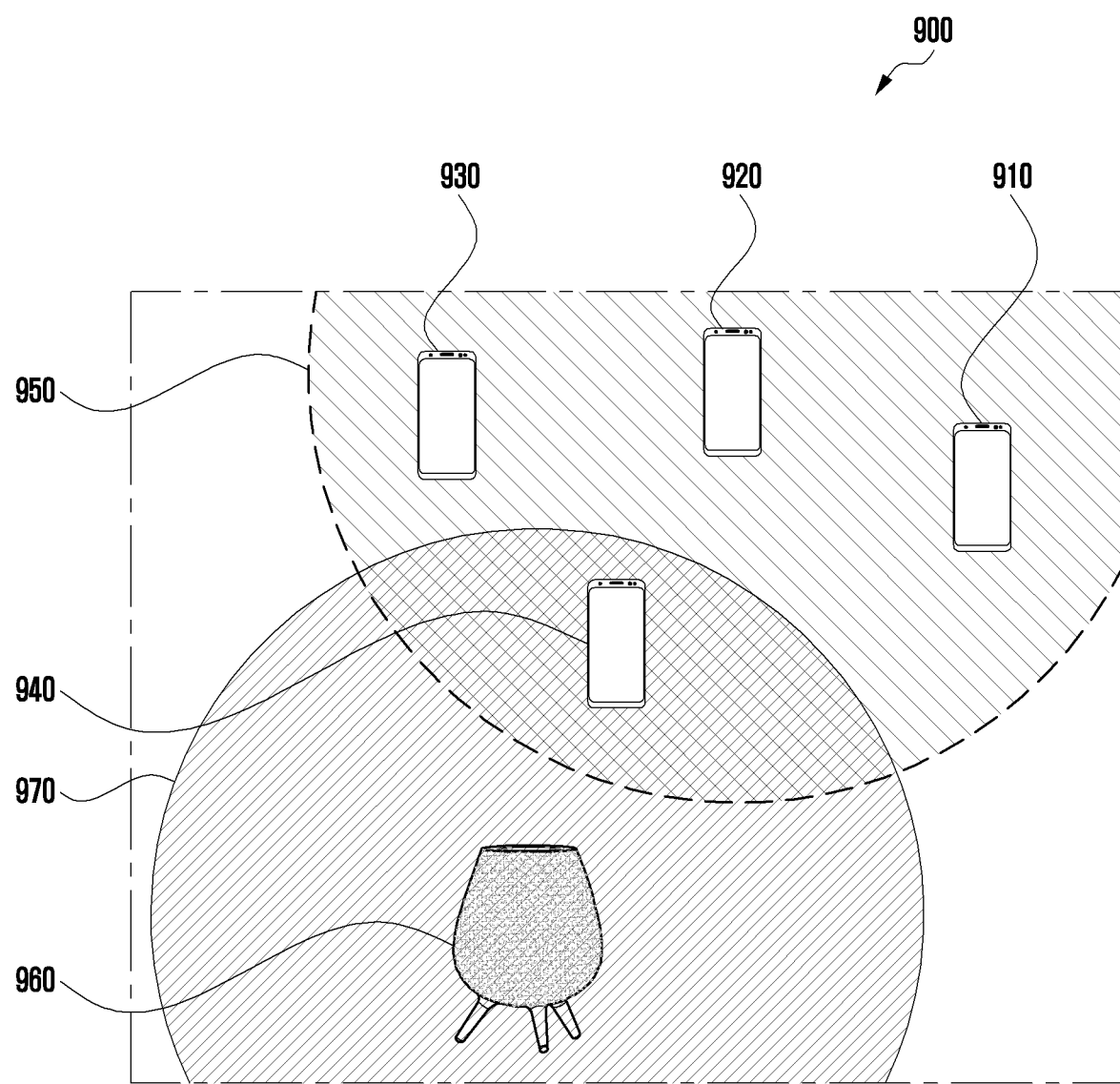
FIG. 9 is a diagram explaining a method for obtaining information of a short-range communication device connected to an electronic device supporting a proximity communication service according to certain embodiments.

FIG. 9 is a diagram 900 explaining a method for obtaining information of a short-range communication device connected to an electronic device supporting a proximity communication service according to certain embodiments.

In FIG. 9 according to an embodiment, explanation will be made under the assumption that a short-range communication device based on the second communication protocol, for example, a Bluetooth speaker 960, is connected to an electronic device 940. However, the short-range communication device is not limited thereto, and may include a device inside a vehicle (e.g., display device or audio device), a desktop PC, a laptop PC, a tablet PC, or a keyboard.

With reference to FIG. 9, among electronic devices 910, 920, 930, and 940, the electronic device 940 may exist in the same short-range wireless communication coverage 970 (e.g., area shaded from a lower left side to an upper right side) (e.g., Bluetooth coverage) as that of the short-range communication device, for example, the Bluetooth speaker 960. The electronic device 940 may be communication-connected with the Bluetooth speaker 960 existing in the short-range wireless communication coverage 970 based on the second communication protocol (e.g., Bluetooth, BLE, or UWB).

In an embodiment, the electronic devices 910, 920, 930, and 940 may configure a cluster 950 based on the first communication protocol. The cluster 950 allows the electronic devices to mutually transmit and receive data to and from one another. For example, if at least one external electronic device is detected through the Bluetooth low energy (BLE), or if the execution of the proximity communication service is detected, one of the electronic devices 910, 920, 930, and 940 may activate a communication function for supporting the first communication protocol (e.g., NAN-based low-power short-range communication function), and may configure the cluster 950 with the at least one external electronic device around the electronic device.

By way of example, and not limiting, the electronic devices 910, 920, 930, and 940 configure the cluster 950 (e.g., area shaded from a lower right side to an upper left side) (e.g., cluster 201 of FIG. 2) based on the first communication protocol after the electronic device 940 is communication-connected based on the second communication protocol (e.g., Bluetooth, BLE, or UWB) with the Bluetooth speaker 960 The Bluetooth speaker 960 exists in short-range wireless communication coverage area 970.

For example, with the activation of the communication function (e.g., NAN-based low-power short-range communication function) for supporting the first communication protocol, the electronic devices 910, 920, 930, 940 may configure the cluster 950 based on the first communication protocol. If the NAN-based low-power short-range communication function is activated, the second communication protocol (e.g., short-range communication excluding the NAN-based low-power short-range communication, for example, Bluetooth, LBE, or UWB) of the electronic devices may be activated, and based on the activated second communication protocol (e.g., Bluetooth, BLE, or UWB), the electronic device, for example, the electronic device 940, may be communication-connected with the Bluetooth speaker 960 existing in the short-range wireless communication coverage 970.

In an embodiment, if the cluster 950 including the electronic devices 910, 920, 930, 940, the electronic device 940 may generate information of the communication-connected Bluetooth speaker 960 existing in the short-range wireless communication coverage 970, and may transmit the generated information to the electronic devices 910, 920, 930.

In another embodiment, among the electronic devices, the electronic device 910 may transmit a subscribe message for requesting a search for the short-range communication device to the electronic devices 910, 920, 930, 940 in the cluster based on the first communication protocol (e.g., NAN-based low-power short-range communication (e.g., Wi-Fi-aware). Among the electronic devices having received the subscribe message, the electronic device 940 connected to the Bluetooth speaker 960 using the Bluetooth communication may generate information identifying the Bluetooth speaker 960, and may transmit the generated information to electronic device 910.

As another example, in case of executing a music application to play music, the electronic device 910 may request the information of the Bluetooth speaker 960 from the external electronic device (e.g., electronic device 940) being short-range communication-connected with the Bluetooth speaker 960 (or headset) existing in the cluster, and may receive the information of the Bluetooth speaker 960 from the electronic device 940 in response to the request.

As still another example, the first electronic device 910 may request the information of short-range communication device(s) (e.g., Bluetooth speaker 960 or Bluetooth keyboard (not illustrated)) from other external electronic devices existing in the cluster based on the kind of a service being currently executed (e.g., music playback or document preparation) or an executable service. In response to this, the electronic device 910 may receive the information of the short-range communication device from electronic devices 920, 930, 940.

According to certain embodiments as described above, the electronic device 910 (or the electronic device 920, 930) may receive the information of the Bluetooth speaker 960 from the electronic device 940. When a signal for communication connection with the Bluetooth speaker 960, the first electronic device 910 may transmit data related to a specific service to the Bluetooth speaker 960 through the electronic device 940. For example, the electronic device 910 may transmit an audio signal for music playback to the electronic device 940 through the first communication circuit. The electronic device 940 may transmit the audio signal for the music playback being received from the electronic device 910 through the first communication circuit to the Bluetooth speaker 960 through the second communication circuit. The Bluetooth speaker 960 may output the music based on the audio signal received from the fourth electronic device 940.

In another embodiment, the short-range communication device may include a pair of short-range communication devices. For example, the pair of short-range communication devices may include a Bluetooth speaker including a first Bluetooth speaker and a second Bluetooth speaker, or a Bluetooth earphone including a first Bluetooth earphone and a second Bluetooth earphone.

For example, explanation will be made in the case that the Bluetooth speaker 960 according to the embodiment of FIG. 9 includes the first Bluetooth speaker and the second Bluetooth speaker, such as stereo speakers. If a signal for communication connection with a pair of short-range communication devices, for example, the Bluetooth speakers 960 is detected, the electronic device 910 may transmit a first audio signal (for example, stereo channel left) for music playback through the first Bluetooth speaker and a second audio signal (for example, stereo channel right) for music playback through the second Bluetooth speaker to the electronic device 940 using the first communication circuit. The electronic device 940 may transmit the first audio signal and the second audio signal for the music playback being received from the electronic device 910 through the first communication circuit to the Bluetooth speakers 960, for example, the first audio signal to the first Bluetooth speaker and the second audio signal to the second Bluetooth speaker, through the second communication circuit. The first Bluetooth speaker and the second Bluetooth speaker may output the music based on the first audio signal and the second audio signal received from the electronic device 940.

Figure 10:
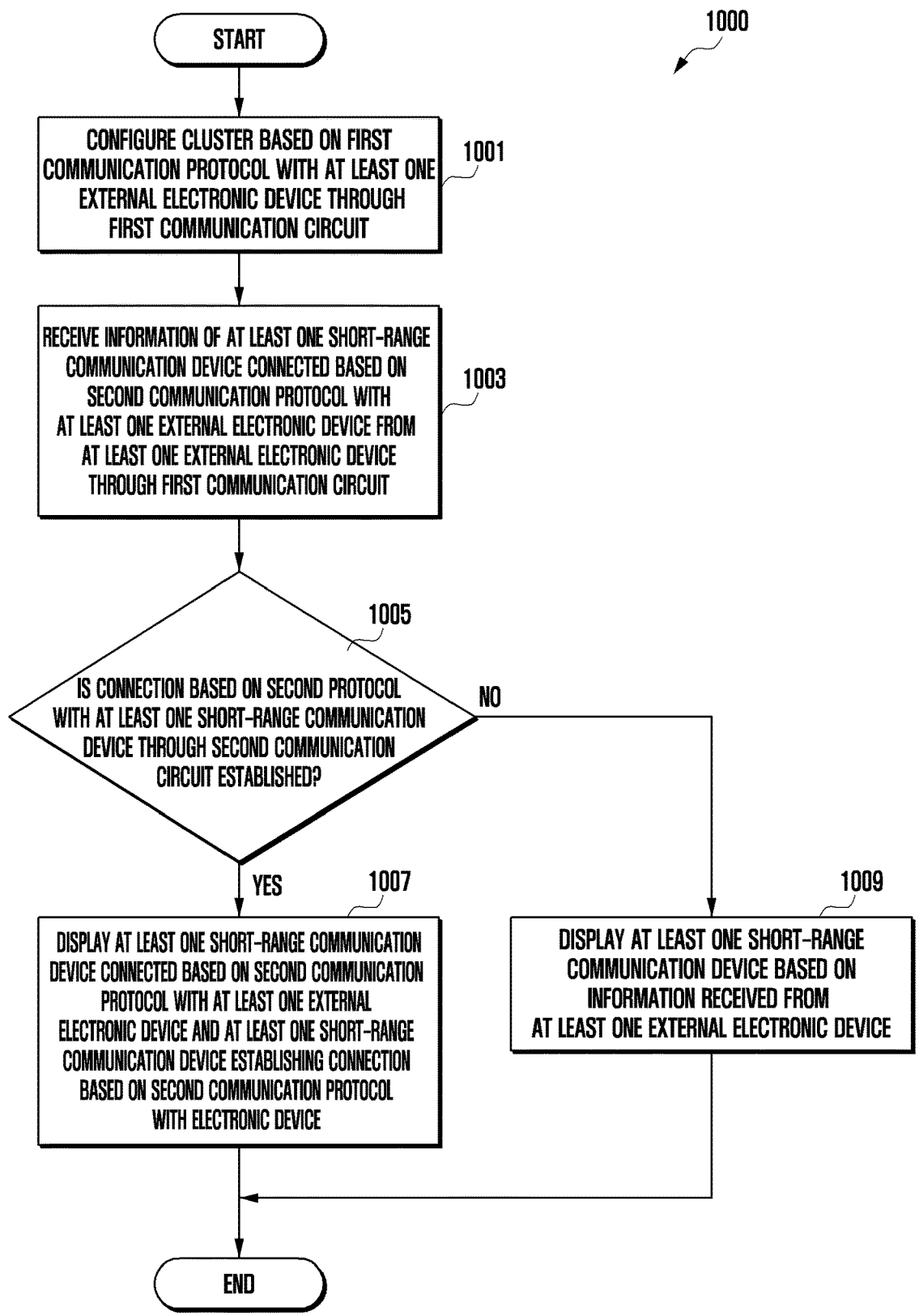
FIG. 10 is a flowchart explaining a method for obtaining and displaying information of a short-range communication device connected to an electronic device supporting a proximity communication service according to certain embodiments.

FIG. 10 is a flowchart 1000 explaining a method for obtaining and displaying information of a short-range communication device connected to an electronic device supporting a proximity communication service according to certain embodiments.

According to an embodiment, because operations 1001, 1003, and 1009 of FIG. 10 may be similar to the operations 601, 603, and 605 of FIG. 6 as described above.

With reference to FIG. 10, the electronic device (e.g., electronic device 501 of FIG. 5), at operation 1001, may configure the cluster based on the first communication protocol with at least one external electronic device through the first communication circuit (e.g., first communication circuit 511 of FIG. 5). At operation 1003, the electronic device 501 may receive information identifying the at least one short-range communication device connected based on the second communication protocol with the at least one external electronic device from the at least one external electronic device in the cluster through the first communication circuit 511.

The electronic device 501, at operation 1005, may determine whether to establish a connection based on the second communication protocol with the at least one short-range communication device through the second communication circuit (e.g., second communication circuit 513 of FIG. 5). In an embodiment, if the second communication circuit 513 is in a deactivated state, the electronic device 501 activate the second communication circuit 513, and may establish the connection based on the second communication protocol with the at least one short-range communication device through the second communication circuit 513.

In an embodiment, if the connection based on the second communication protocol with the at least one short-range communication device is established through the second communication circuit 513, the electronic device 501, at operation 1007, may display, on the display (e.g., display 531 of FIG. 5), at least one indicator indicating the at least one short-range communication device connected based on the second communication protocol with the at least one external electronic device and at least one other indicator indicating the at least one short-range communication device establishing the connection based on the second communication protocol with the electronic device 501. For example, the electronic device 501 may separately display, on the display 531, the at least one indicator indicating the at least one external electronic device identified using the information of the short-range communication device received from the external electronic device and the at least one other indicator indicating at least one other external electronic device.

In an embodiment, if the connection based on the second communication protocol with the at least one short-range communication device is not established through the second communication circuit 513, the electronic device 501, at operation 1009, may display an indicator indicating the at least one short-range communication device on the display 531 based on the information received from the at least one external electronic device. For example, the electronic device 501 may display identification information (e.g., name) of the at least one short-range communication device, attributes (e.g., type and specification), status information (e.g., on/off), battery residual quantity information, communication strength information, or communication protocol type information, or may display the at least one short-range communication device and the external electronic device connected based on the second communication protocol in association with each other.

In an embodiment, although it has been described that the electronic device 501 displays, on the display 531, the at least one short-range communication device establishing the connection based on the second communication protocol through the second communication circuit 513, the display operation is not limited thereto. For example, the electronic device 501 may display not only the at least one short-range communication device establishing the connection but also the short-range communication device located adjacent to the electronic device 501 (e.g., short-range communication device having a communication signal strength that exceeds a designated value) searched for through the search operation for the short-range communication device located around the electronic device 501.

Figure 11:
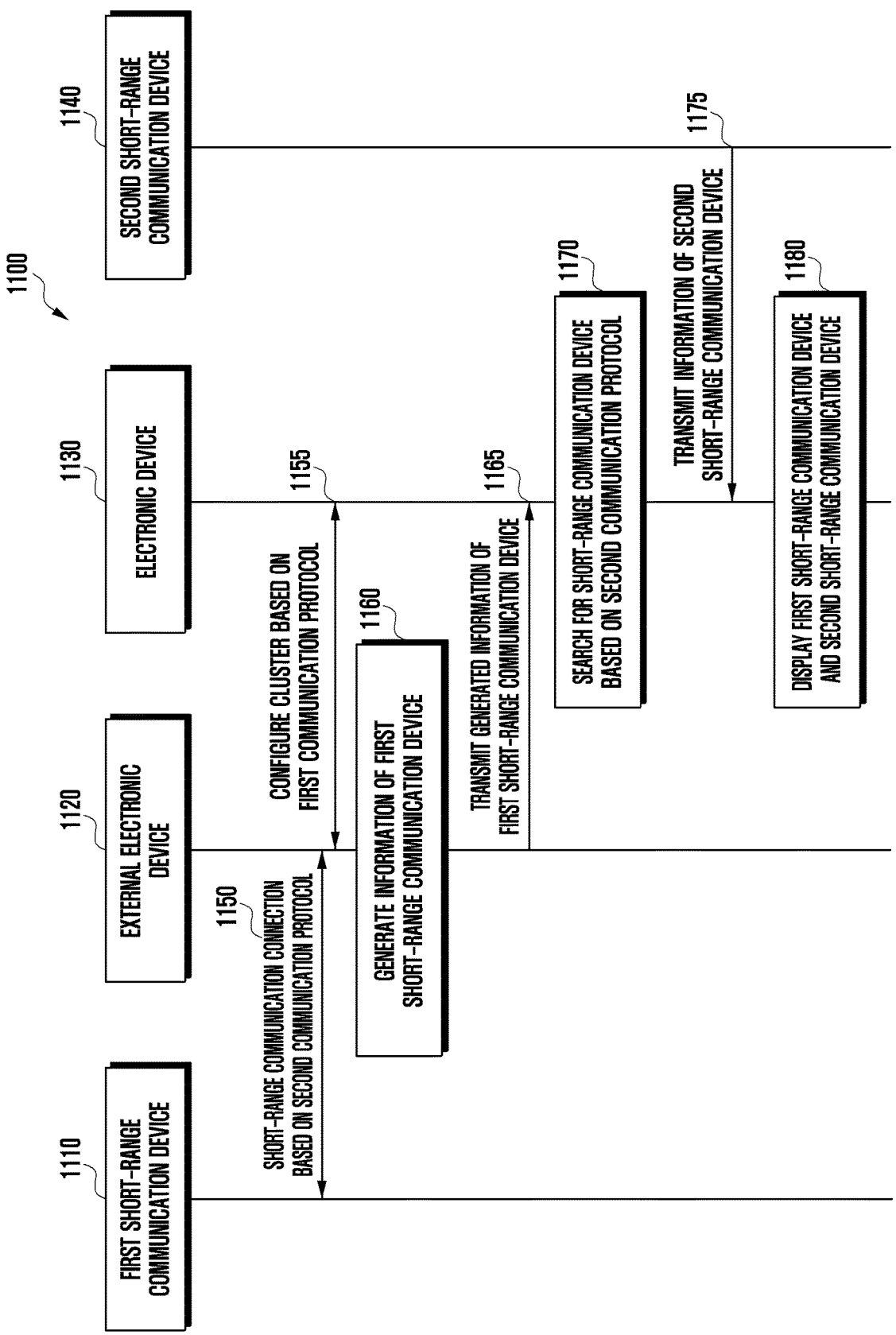
FIG. 11 is a diagram illustrating signal flows among a first short-range communication device, an external electronic device, an electronic device, and a second short-range communication device according to certain embodiments.

FIG. 11 is a diagram 1100 illustrating signal flows among a first short-range communication device 1110, an external electronic device 1120, an electronic device 1130, and a second short-range communication device 1140 according to certain embodiments.

With reference to FIG. 11, the first short-range communication device 1110 and the external electronic device 1120, at operation 1150, may be connected with each other through short-range communication based on the second communication protocol. For example, the short-range communication connection based on the second communication protocol may include a short-range communication connection excluding the NAN-based low-power short-range communication. In FIG. 11 according to an embodiment, although it has been described that the external electronic device 1120 is connected to one short-range communication device 1110 through the short-range communication, the connection of the external electronic device is not limited thereto. For example, the external electronic device 1120 may be connected to a plurality of short-range communication devices including the short-range communication device 1110 through the short-range communication.

In an embodiment, the external electronic device 1120 and the electronic device 1130 (e.g., electronic device 501 of FIG. 5), at operation 1155, may configure the cluster based on the first communication protocol. For example, the first communication protocol may include the NAN-based low-power short-range communication.

In an embodiment, although it has been described that the first short-range communication device 1110 and the external electronic device 1120, at operation 1150, are communication-connected with each other based on the second communication protocol, and then the external electronic device 1120 and the electronic device 1130, at operation 1155, configure the cluster based on the first communication protocol, the operation of the electronic devices is not limited thereto. For example, the external electronic device 1120 and the electronic device 1130, at operation 1155, may configure the cluster based on the first communication protocol, and then the first short-range communication device 1110 and the external electronic device 1120, at operation 1150, may be communication-connected with each other based on the second communication protocol.

In an embodiment, the external electronic device 1120, at operation 1160, may generate information of the first short-range communication device 1110 connected based on the second communication protocol. At operation 1165, the external electronic device 1120 may transmit the generated information of the first short-range communication device 1110 to the electronic device 1130 through the first communication circuit (e.g., first communication circuit 511 of FIG. 5). For example, if the external electronic device 1120 configures the cluster with the electronic device 1130, the external electronic device 1120 may generate the information of the first short-range communication device 1110 connected based on the second communication protocol, and may transmit the generated information to the electronic device 1130. As another example, if a signal for requesting the information of the first short-range communication device 1110 is received from the electronic device 1130 in the cluster, the external electronic device 1120 may generate and transmit the information of the first short-range communication device 1110 to the electronic device 1130.

In an embodiment, the electronic device 1130, at operation 1170, may search for the short-range communication device based on the second communication protocol. For example, the electronic device 1130 may perform a search operation (e.g., inquiry operation) through the second communication circuit (e.g., second communication circuit 513 of FIG. 5) in order to identify whether the short-range communication device, which is communication-connectable or which can provide a specific service, is located around the electronic device 1130. The electronic device 1130 may search for the short-range communication device having entered a pairing mode after configuring the short-range communication device for the short-range communication connection, for example, the Bluetooth communication connection, in a searchable mode (e.g., activating (e.g., on) the Bluetooth).

In an embodiment, if the search operation, for example, the short-range signal, is received from the electronic device 1130, the second short-range communication device 1140, at operation 1175, may transmit, to the electronic device 1130, a response signal including information of the second short-range communication device 1140 (e.g., address information, capability information, location information, identification information (e.g., name) of the short-range communication device, attributes (e.g., type and specification), status information, battery residual quantity information, communication strength information, or communication protocol type information).

In an embodiment, the electronic device 1130, at operation 1180, may display indicators indicating the first short-range communication device 1110 and the second short-range communication device 1140 on the display (e.g., display 531 of FIG. 5). For example, the electronic device 1130 may separately display the indicator indicating the first short-range communication device 1110 connected based and the indicator indicating the second short-range communication device 1140 searched for based on the second communication protocol by the electronic device 1130.

In an embodiment, the electronic device 1130 may detect a user input for one of the communication connection between the first short-range communication device 1110 and the second short-range communication device 1140 being displayed on the display 531. For example, if the user input for selecting the first short-range communication device 1110, is detected, the electronic device 1130 may transmit data related to a specific service to the first short-range communication device 1110 selected through the external electronic device 1120.

However, the data transmission is not limited thereto, and for example, if an input for selecting the first short-range communication device 1110 is detected, the electronic device 1130 may amplify an output signal of the second communication circuit 513. The electronic device 1130 may be directly communication-connected with the first short-range communication device 1110 based on the second communication protocol through the second communication circuit 513 whose output signal has been amplified.

As another example, when the user input for selecting the second short-range communication device 1140, is detected, the electronic device 1130 may be communication-connected based on the second communication protocol with the second short-range communication device 1140.

In another embodiment, if the electronic device 1130 has a history in which the electronic device is pre-connected with the second short-range communication device 1140, the electronic device 1130 may be automatically communication-connected with the second short-range communication device 1140 based on the second communication protocol in case of the power-on of the second short-range communication device 1140.

FIGS. 12A to 12D are diagrams 1200 explaining a method for obtaining and displaying information of a short-range communication device connected to an electronic device supporting a proximity communication service according to certain embodiments.

In FIGS. 12A to 12D according to certain embodiments, although explanation has been made under the assumption that a device list based on the Bluetooth communication is displayed through a Bluetooth configuration screen, the display is not limited thereto, and a device list based on the Wi-Fi or Wi-Fi direct communication may be displayed through the Wi-Fi or Wi-Fi direct configuration screen.

Figure 12A:
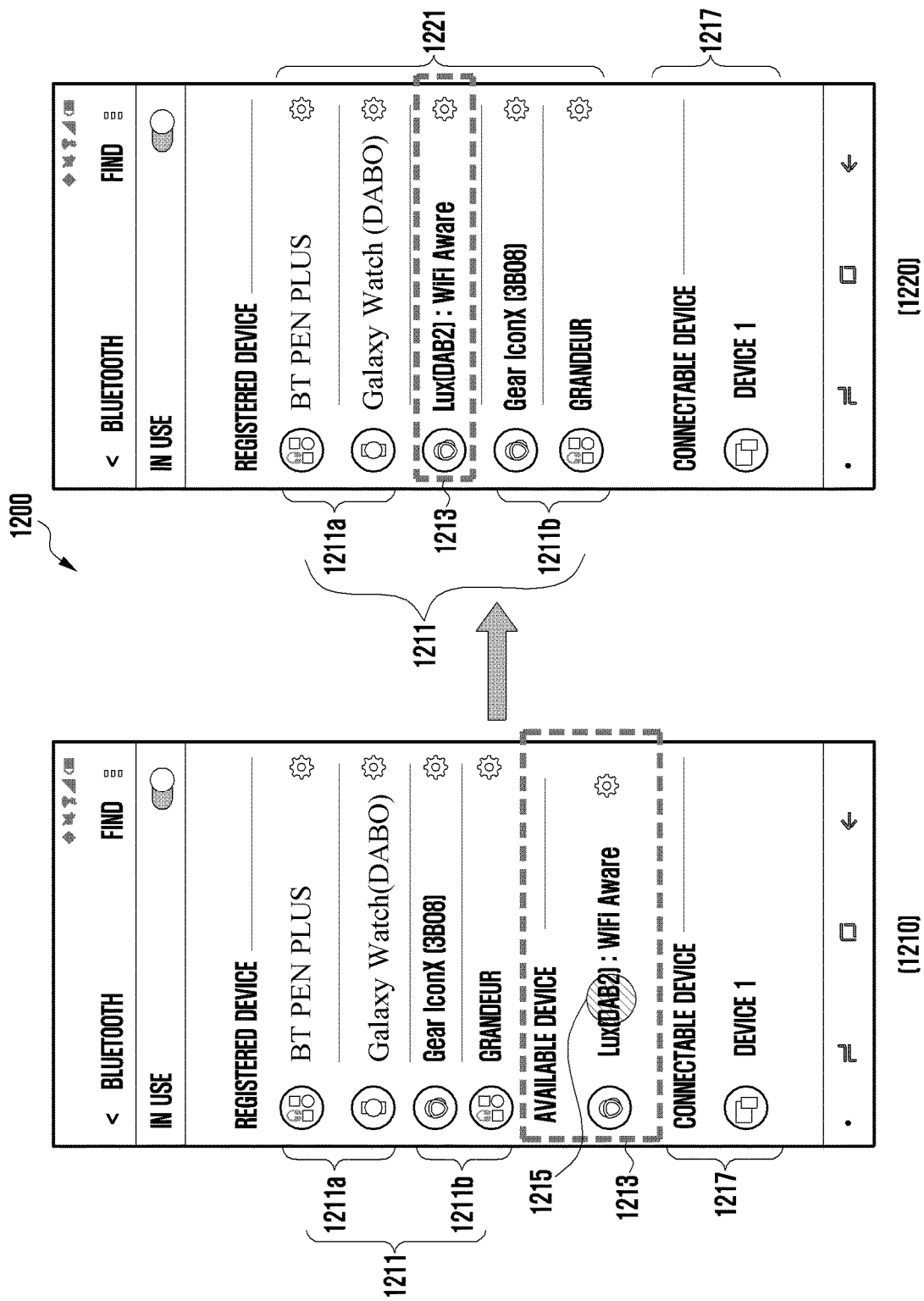
FIG. 12A is a diagram explaining a method for obtaining and displaying information of a short-range communication device connected to an electronic device supporting a proximity communication service according to certain embodiments.

With reference to FIG. 12A, the electronic device (e.g., electronic device 501 of FIG. 5, electronic device 830 of FIG. 8, or electronic device 1130 of FIG. 11) may receive, through the first communication circuit 511, information of the external electronic device (e.g., external electronic device 820 of FIG. 8 or external electronic device 1120 of FIG. 11) connected through the first communication circuit (e.g., first communication circuit 511 of FIG. 5) supporting the first communication protocol, or the short-range communication device (e.g., short-range communication device 810 of FIG. 8 or the first short-range communication device 1110 of FIG. 11) connected through the second communication circuit (e.g., second communication circuit 513 of FIG. 5) supporting the second communication protocol.

For example, as denoted by a reference numeral 1210, when a user input for entering a short-range communication configuration screen, for example, a Bluetooth configuration screen, is detected, the electronic device may display the Bluetooth configuration screen on the display (e.g., display 531 of FIG. 5). The Bluetooth configuration screen may include a registered device list 1211 (e.g., at least one device 1211b being connected with the electronic device and/or at least one device 1211a having a history of pre-connection, or previously connected within a predetermined amount of time), an indicator indicating a short-range communication device 1213 (e.g., available device) connected with the external electronic device that received from the external electronic device through the first communication circuit 511, and/or another indicator indicating short-range communication device 1217 (e.g., second short-range communication device 1140 of FIG. 11) searched for based on the second communication protocol with the electronic device. The electronic device may display information for indicating that the short-range communication device 1213 is received from the external electronic device existing in the same cluster as that of the electronic device. For example, a communication protocol type (e.g., Wi-Fi aware), together with the identification information of the short-range communication device 1213 (e.g., name (e.g., Lux) of the short-range communication device 1213).

According to certain embodiments, although not illustrated, the electronic device may further display attribute information, status information (e.g., on/off), battery residual quantity information, and/or communication strength information of the short-range communication device 1213.

The indicators 1213 and 1217 can be selectable objects in certain embodiments.

In an embodiment, if a user input 1215 (such as a touch input) for selecting a signal for communicating with the short-range communication device 1213 is detected, the electronic device may transfer data related to the specific service to the short-range communication device 1213 through the external electronic device. For example, the electronic device may transmit the data related to the specific service with the short-range communication device 1213 to the external electronic device through the first communication circuit 511. The external electronic device may transmit the data related to the specific service received from the electronic device through the first communication circuit (e.g., first communication circuit 511) to the short-range communication device 1213 through the second communication circuit (e.g., second communication circuit 513). In an embodiment, in response to the detection of the user input 1215 for selecting the short-range communication device 1213, the electronic device may include the short-range communication device 1213 in the registered device list 1221 to be displayed in order to indicate that it is possible to perform the specific service through the short-range communication device 1213 as denoted by a reference numeral 1220. The short-range communication device 1213 may execute the specific service (e.g., music playback) corresponding to the request from the electronic device being received through the external electronic device.

According to certain embodiments, although not illustrated, the electronic device may transmit the data related to the specific service to a plurality of short-range communication devices through a plurality of external electronic devices.

In an embodiment, the electronic device may communicate with the short-range communication device (e.g., GRANDEUR). The short range communication device, GRANDEUR can be connected based on the second communication protocol with the short-range communication device 1213. The short-range communication device 1213 can be connected with the external electronic device and information about short-range communication device 1213 can be received from the external electronic device (e.g., external electronic device 1120 of FIG. 11) through the first communication circuit 511. Explanation will be made under the assumption that the short-range communication device 1213 connected with the external electronic device and the short-range communication device connected based on the second communication protocol according to an embodiment are the Bluetooth speaker and a device inside a vehicle, for example, an audio device, respectively. The electronic device may transmit the specific service, for example, an audio signal related to the music playback, to the external electronic device through the first communication circuit 511. The external electronic device may transmit the audio signal related to the music playback being received from the electronic device to the short-range communication device 1213 through the second communication circuit (e.g., second communication circuit 513). The electronic device may transmit the audio signal related to the music playback to the short-range communication device through the second communication circuit 513. The short-range communication device 1213 and 1217 may play the music based on the received audio signal related to the music playback.

In an embodiment, the electronic device may communicate with the plurality of short-range communication devices (e.g., the first short-range communication device and the second short-range communication device) connected with the plurality of external electronic devices using the plurality of external electronic devices (e.g., the first external electronic device and the second external electronic device) received through the first communication circuit 511 supporting the first communication protocol. Explanation will be made under the assumption that the plurality of short-range communication device connected with the plurality of external electronic devices according to an embodiment are a plurality of Bluetooth speakers. The electronic device may transmit the audio signal related to the specific service, for example, the music playback, to the first external electronic device and the second external electronic device through the first communication circuit 511. The first external electronic device and the second external electronic device may transmit the audio signal related to the music playback being received from the electronic device to the first short-range communication device and the second short-range communication device through the second communication circuit 513. The first short-range communication device and the second short-range communication device may play the music based on the audio signal related to the music playback being received from the first external electronic device and the second external electronic device through the second communication circuit 513.

According to certain embodiments, the electronic device plays the music through the plurality of short-range communication devices, for example, the plurality of Bluetooth speakers, and thus can provide imminent sound to the user.

Figure 12B:
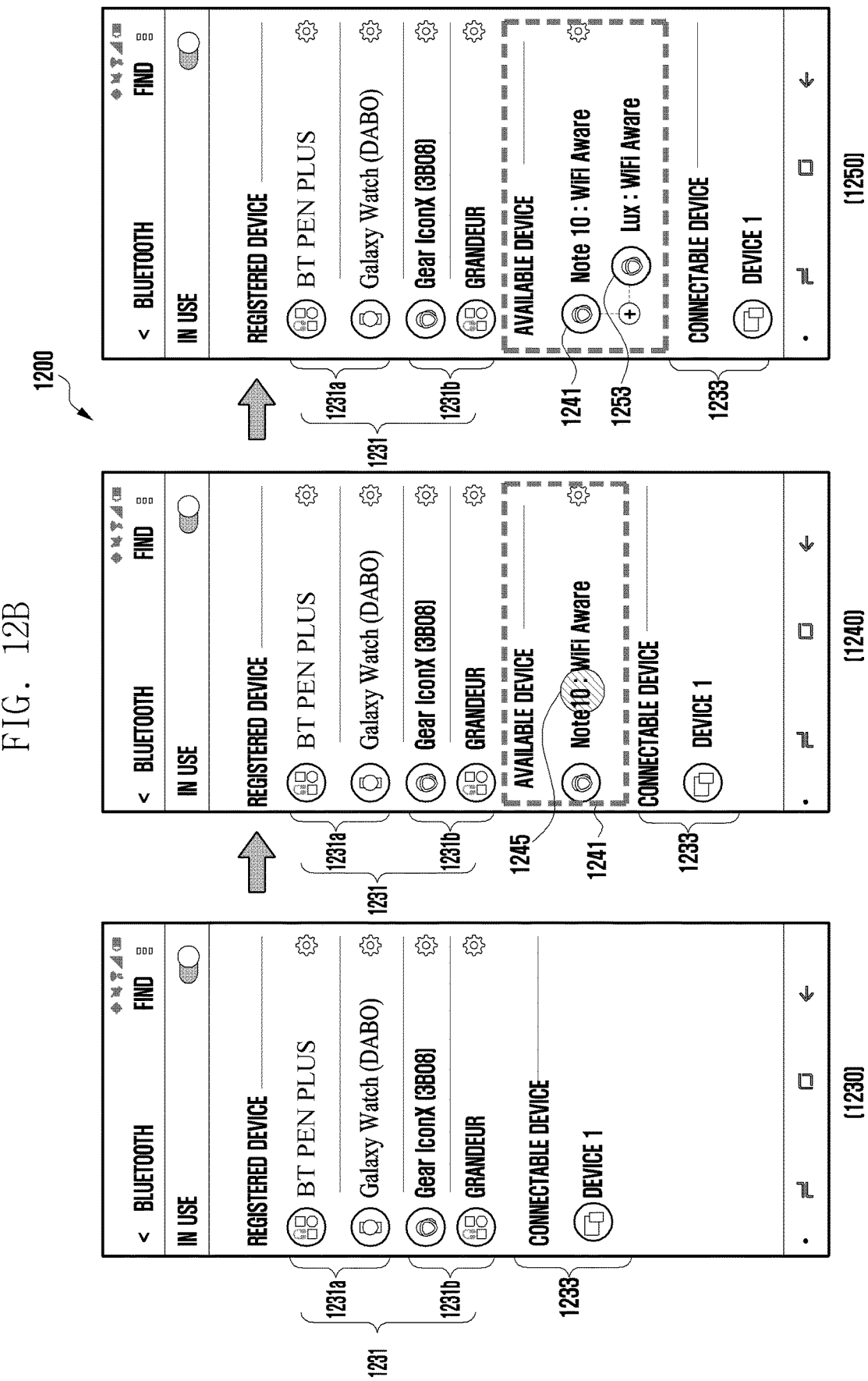
FIG. 12B is a diagram explaining a method for obtaining and displaying information of a short-range communication device connected to an electronic device supporting a proximity communication service according to certain embodiments.

With reference to FIG. 12B according to another embodiment, as denoted by a reference numeral 1230, if the user input for entering the Bluetooth configuration screen is detected, the electronic device may display the Bluetooth configuration screen on the display. The Bluetooth configuration screen may include a registered device list 1231 (e.g., at least one device 1231b being connected with the electronic device and/or at least one device 1231a having a history of pre-connection) and/or a short-range communication device 1233 (e.g., second short-range communication device 1140 of FIG. 11) searched for based on the second communication protocol with the electronic device.

In an embodiment, if a user input for entering the Bluetooth configuration screen is detected, the electronic device may configure the cluster based on the first communication protocol with the at least one external electronic device through the first communication circuit. In an embodiment, if the user input for entering the Bluetooth configuration screen is detected in case that the first communication circuit 511 is in a deactivated state, the electronic device may configure the cluster based on the first communication protocol with the at least one external electronic device after activating the first communication circuit 511 in the deactivated state.

In an embodiment, the electronic device may display at least one indicator indicating the at least one external electronic device 1241 in the cluster, together with the registered device list 1231 as denoted by a reference numeral 1240 and the indicator indicating the short-range communication device 1233 (short-range communication device 1233 is connected based on the second communication protocol). The electronic device may display information for indicating that the cluster has been configured based on the first communication protocol, for example, a communication protocol type (e.g., Wi-Fi aware) together with the identification information of the external electronic device 1241 (e.g., name (e.g., note10) of the external electronic device 1241).

In an embodiment, if the user input 1245 for selecting the external electronic device 1241 is detected, the electronic device may display an indicator indicating the short-range communication device 1253 that is connected based on the second communication protocol with the external electronic device 1241 together with the registered device list 1231 as denoted by the reference numeral 1250 and the external electronic device 1241. The electronic device may display information for indicating that the short-range communication device 1253 (e.g., "LUX") is received from the external electronic device (e.g., "Note 10") existing in the same cluster.

In an embodiment, although not illustrated, if a user input for selecting the short-range communication device 1253 is detected, the electronic device may transmit the data related to the specific service using the selected short-range communication device 1253 to the selected short-range communication device 1253 through the external electronic device 1241. For example, the electronic device may transmit the specific service, for example, the audio signal related to the music playback, to the external electronic device 1241 through the first communication circuit 511. The external electronic device 1241 may transmit the audio signal related to the music playback received from the electronic device to the selected short-range communication device 1253 through the second communication circuit (e.g., second communication circuit 513). The selected short-range communication device 1253 may play the music based on the audio signal related to the music playback being received through the external electronic device.

Figure 12C:
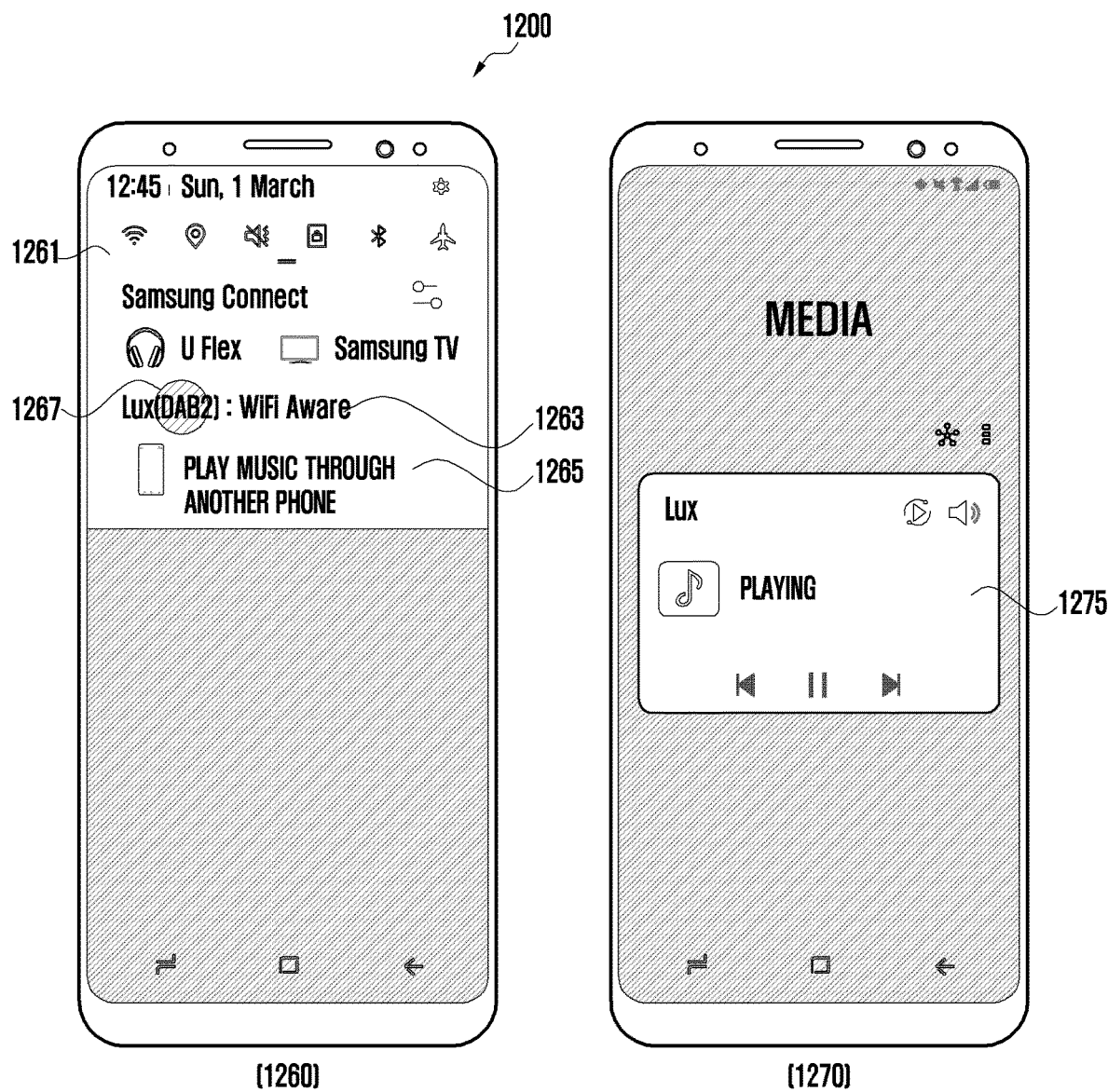
FIG. 12C is a diagram explaining a method for obtaining and displaying information of a short-range communication device connected to an electronic device supporting a proximity communication service according to certain embodiments.

With reference to FIG. 12C according to still another embodiment, as denoted by reference numeral 1260, the electronic device may display a short-range communication device 1263 connected based on the second communication protocol with at least one external electronic device existing in the same cluster as that of the electronic device (e.g., cluster configured based on the first communication protocol) through a quick panel window 1261. For example, if a user gesture (e.g., gesture in a direction from an upper end to a lower end of the electronic device) for outputting the quick panel window 1261 is detected during the music playback, the electronic device may display the quick panel window 1261 on at least a part of the display 531. The quick panel window 1261 may display therein the short-range communication device 1263 capable of performing the music playback, which is connected based on the second communication protocol with the at least one external electronic device existing in the same cluster (e.g., cluster configured based on the first communication protocol) as that of the electronic device. However, the display function of the quick panel window 1261 is not limited thereto, and the electronic device may perform a search operation in order to identify whether the short-range communication device capable of performing the communication connection or providing the specific service is located around the electronic device. The quick panel window 1261 may further display the short-range communication device 1265 capable of performing the music playback based on the second communication protocol, which is located around the electronic device searched for through the search operation.

In an embodiment, if a user input 1267 for selecting the short-range communication device 1263 displayed in the quick panel window 1261 is detected, the electronic device may display a screen including music playback information 1275 as denoted by reference numeral 1270. For example, the electronic device may transmit the audio signal related to the music playback to the external electronic device through the first communication circuit 511, and the external electronic device may transmit the audio signal related to the music playback received from the electronic device through the first communication circuit (e.g., first communication circuit 511) to the short-range communication device 1263 through the second communication circuit (e.g., second communication circuit 513). The short-range communication device 1263 may play the music based on the audio signal related to the music playback received from the external electronic device. In an embodiment, the service has been described as the music playback, but is not limited thereto.

According to the above-described embodiment, although it has been described that the music is played through the short-range communication device connected based on the second communication protocol with the external electronic device (e.g., external electronic device connected based on the first communication protocol) existing in the cluster, the way of the music playback is not limited thereto, a file (e.g., an image file or a document file) can be shared by the short-range communication device connected to the external electronic device existing in the cluster. For example, the electronic device may execute a photo application in order to share an image file. If a user input for sharing the image file is detected on the screen including at least one image being displayed in response to the execution of the photo application, the electronic device may receive the information of the short-range communication device being connected with the external electronic device existing in the cluster, and based on this, the electronic device may configure a user interface for sharing the image file with the short-range communication device. The electronic device may share an image with the short-range communication device through the external electronic device using the user interface for sharing the image file. If the user input for sharing the image file is detected, the electronic device may transmit the image file to the external electronic device through the first communication circuit 511 supporting the first communication protocol. The external electronic device may transmit the image file received from the electronic device to the short-range communication device through the second communication circuit (e.g., second communication circuit 513) supporting the second communication protocol.

According to an embodiment, the service that may be performed through the short-range communication device connected based on the second communication protocol may include not only the above-described music playback and file sharing but also document preparation and an Internet of things (IoT) service.

Figure 12D:
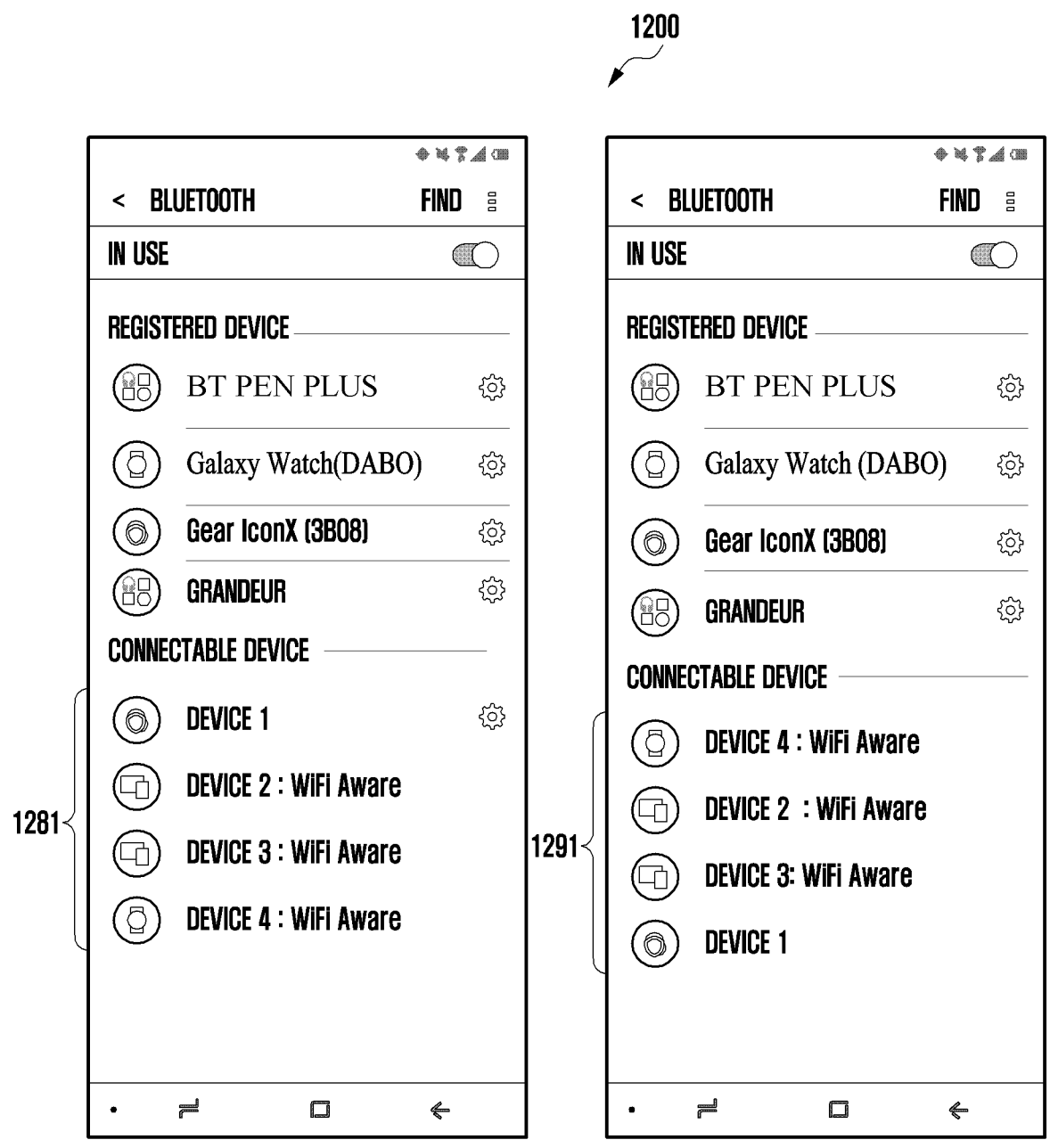
FIG. 12D is a diagram explaining a method for obtaining and displaying information of a short-range communication device connected to an electronic device supporting a proximity communication service according to certain embodiments.

With reference to FIG. 12D according to still another embodiment, as denoted by reference numeral 1280, the electronic device may display a list 1281 of short-range communication devices including a short-range communication device (e.g., device 1) based on the searched second communication protocol, and short-range communication devices (e.g., device 2, device 3, and device 4) connected based on the second communication protocol with the at least one external electronic device existing in the same cluster (e.g., cluster configured based on the first communication protocol) as that of the electronic device. The electronic device may display information for indicating that the short-range communication device is received from the external electronic device existing in the same cluster as that of the electronic device connected with the short-range communication device, for example, a communication protocol type (e.g., Wi-Fi aware), together with the identification information of the short-range communication device (e.g., device 2, device 3, and device 4). As the communication protocol type is displayed, the short-range communication device (e.g., device 2, device 3, and device 4) connected based on the second communication protocol with the at least one external electronic device existing in the cluster may be discriminated from the short-range communication device (e.g., device 1) searched for based on the second communication protocol.

In an embodiment, the electronic device may receive the information of the short-range communication device connected based on the second protocol with the at least one external electronic device from the at least one external electronic device existing in the same cluster, and the received information may include the communication signal strength. The electronic device may display the short-range communication devices in the order of their communication signal strength based on the communication signal strength of the received short-range communication devices. For example, if it is assumed that the communication signal strength is higher in the order of device 4, device 2, device 3, and device 1, the electronic device may display the list 1291 of the short-range communication devices in the order of device 4, device 2, device 3, and device 1 as denoted by reference numeral 1290.

However, the display order is not limited thereto, and the information of the short-range communication devices being received from the at least one external electronic device existing in the same cluster may include a device type (e.g., audio device, keyboard, or PC). The electronic device may display the short-range communication devices in the order of their high relevance of the functions (e.g., music playback, data sharing, or document preparation) being currently executed based on the type of the received short-range communication device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first communication circuit configured to support a first communication protocol;
a second communication circuit configured to support a second communication protocol, wherein the second communication protocol supports a different short range communication protocol than the first communication protocol;
a display; and
at least one processor operatively connected to the first communication circuit and the display, wherein the at least one processor is configured to:
configure a cluster with at least one external electronic device based on the first communication protocol through the first communication circuit,
receive through the first communication circuit, from the at least one external electronic device, information identifying at least one short-range communication device connected to the at least one external electronic device via the second communication protocol,
control the display to display a user interface including identification information of the at least one external electronic device that has transmitted the information identifying at least one short-range communication device, identification information of the at least one short-range communication device, and type information of the first communication protocol,
detect an input for selecting a short-range communication device among the at least one short-range communication device displayed in the user interface, and
in response to the input, transmit, to an external electronic device connected to the selected short-range communication device, data related to a specific function of the electronic device so as to perform the specific function of the electronic device using the selected short-range communication device.

2. The electronic device of claim 1, wherein the first communication protocol supports a low-power short-range communication based on neighbor awareness networking (NAN).

3. The electronic device of claim 1,
wherein the at least one processor is configured to:
search for at least one other connectable short-range communication device based on the second communication protocol through the second communication circuit, and
control the display to display at least one other indicator indicating the at least one other short-range communication device.

4. The electronic device of claim 3, wherein control the display to display at least one other indicator indicating the at least one other short-range communication device comprises control the display to separately display the at least other indicator of the at least one other short-range communication device connected based on the second communication protocol with the at least one indicators of the at least one external electronic device and the at least one searched short-range communication device.

5. The electronic device of claim 1, wherein the at least one processor is configured to transmit a request for a search for the at least one short-range communication device to the at least one external electronic device through the first communication circuit.

6. The electronic device of claim 1, wherein the at least one processor is configured to in response to the input, transmit a signal to the external electronic device connected to the selected short-range communication device among the at least one external electronic device through the first communication circuit.

7. An electronic device comprising:
a first communication circuit configured to support a first communication protocol;
a second communication circuit configured to support a second communication protocol; and
at least one processor operatively connected to the first communication circuit and the second communication circuit,
wherein the at least one processor is configured to:
establish a connection via the second communication protocol with at least one short-range communication device using the second communication circuit,
configure a cluster via the first communication protocol with an external electronic device through the first communication circuit,
generate information identifying the at least one short-range communication device connected via the second communication protocol,
transmit the generated information of the at least one short-range communication device to the external electronic device through the first communication circuit, and
receive data related to a specific function of the external electronic device from the external electronic device via the first communication protocol through the first communication circuit and transmit the data to the at least one short-range communication device using the second communication protocol through the second communication circuit.

8. The electronic device of claim 7, wherein the information identifying the at least one short-range communication device comprises at least one of address information, capability information, location information, identification information, a device type, status information, battery residual quantity information, communication strength information, or communication protocol type information.

9. The electronic device of claim 7, wherein when a signal for requesting information identifying the at least one short-range communication device is received from the external electronic device through the first communication circuit, the at least one processor is configured to generate the information identifying the at least one short-range communication device and to transmit the information to the external electronic device through the first communication circuit.

10. The electronic device of claim 7, wherein when a signal for requesting a search for the at least one short-range communication device is received from the external electronic device through the first communication circuit, the at least one processor is configured to generate at least one of the information identifying the at least one short-range communication device or the information identifying at least one short-range communication device in which a strength of a received communication signal exceeds a designated value and to transmit the generated information to the external electronic device.

11. A method for obtaining information of a short-range communication device using an electronic device supporting a proximity communication service, the method comprising:
configuring a cluster with at least one external electronic device through a first communication circuit based on a first communication protocol;
receiving, through the first communication circuit, from the at least one external electronic device, information identifying at least one short-range communication device connected based on a second communication protocol with the at least one external electronic device, the second communication protocol different from the first communication protocol; and
displaying a user interface including identification information of the at least one external electronic device that has transmitted the information identifying at least one short-range communication device, identification information of the at least one short-range communication device, and type information of the first communication protocol;
detecting an input for selecting a short-range communication device among the at least one short-range communication device displayed in the user interface, and
in response to the input, transmitting, to an external electronic device connected to the selected short-range communication device, data related to a specific function of the electronic device so as to perform the specific function of the electronic device using the selected short-range communication device.

12. The method of claim 11, wherein the first communication protocol supports a low-power short-range communication based on neighbor awareness networking (NAN).

13. The method of claim 11, further comprising:
searching for at least one connectable other short-range communication device through a second communication circuit supporting the second communication protocol; and
displaying at least one other indicator indicating the at least one connectable other short-range communication device.

14. The method of claim 13, wherein the at least one indicator indicating the at least one short-range communication device and the at least indicator indicating the at least one searched short-range communication device are distinguishably displayed.

15. The method of claim 11, further comprising transmitting a request for a search for the at least one short-range communication device to the at least one external electronic device through the first communication circuit.

16. The method of claim 11, further comprising:
transmitting a signal for the detected input to the external electronic device connected to the selected short-range communication device in response to detecting the input.

\* \* \* \* \*